United States Patent [19]
Kato

[11] Patent Number: 6,040,863
[45] Date of Patent: Mar. 21, 2000

[54] METHOD OF CODING AND DECODING MOTION VECTOR AND APPARATUS THEREFOR, AND METHOD OF CODING AND DECODING PICTURE SIGNAL AND APPARATUS THEREFOR

[75] Inventor: Motoki Kato, Kanagawa, Japan

[73] Assignee: Sony Corporation, Tokyo, Japan

[21] Appl. No.: 09/216,437

[22] Filed: Dec. 18, 1998

Related U.S. Application Data

[62] Division of application No. 08/886,804, Jul. 2, 1997, Pat. No. 5,946,042, which is a division of application No. 08/770,585, Dec. 19, 1996, Pat. No. 5,701,164, which is a continuation of application No. 08/290,888, filed as application No. PCT/JP94/00473, Mar. 24, 1994.

[30] Foreign Application Priority Data

Mar. 24, 1993 [JP] Japan ................................ 5-065689
Apr. 30, 1993 [JP] Japan ................................ 5-124686

[51] Int. Cl.[7] ................................................ H04N 7/32
[52] U.S. Cl. ............................................. 348/415; 348/420
[58] Field of Search ........................... 348/384, 390, 348/400, 401, 402, 409, 415, 416, 699, 700, 701, 420; 382/232, 233, 236, 238

[56] References Cited

U.S. PATENT DOCUMENTS

| | | | |
|---|---|---|---|
| 5,132,792 | 7/1992 | Yonemitsu | 348/699 |
| 5,210,605 | 5/1993 | Zaccarin | 348/699 |
| 5,424,779 | 6/1995 | Odaka | 348/416 |
| 5,455,629 | 10/1995 | Sun | 348/420 |
| 5,675,387 | 10/1997 | Hoogenboom | 348/416 |

OTHER PUBLICATIONS

Test Model Editing Committee, International Organisation for Standardisation, "Coded Representation of Picture and Audio Information", ISO–IEC/JTC1/SC29/WG11 MPEG93/225b Test Model 4, pp. 1–78, Feb. 1993
International Organization for Standardization, "Information Technology–Generic Coding of Moving Pictures and Associated Audio", ISO/IEC JTC1/SC29 WG11/602, Seoul, Korea, pp. 1–176, Nov. 1993.

*Primary Examiner*—Bryan Tung
*Attorney, Agent, or Firm*—Frommer Lawrence & Haug, LLP.; William S. Frommer; Dennis M. Smid

[57] ABSTRACT

A difference vector determination element used in an apparatus for coding motion vector includes register memories (PMV) of which number is equal to sum of maximum transmission numbers N and M of forward predictive and backward predictive motion vectors. Motion vector counter counts the number of transmission of motion vectors to output a motion vector count signal. Register index designation signal generator designates indices of (1~N(N+1)~(N+M)) in order of transmission of forward predictive or backward predictive motion vectors on the basis of attached information such as motion compensation mode, prediction type, and picture structure, etc. of motion vector, and the motion vector count signal from the motion vector counter to allow switch to perform switching operation, thus allowing register memories (PMV) and motion vectors to have one-to-one correspondence relationship. Difference circuit determines a difference between a motion vector inputted thereto and a value taken out from register memory (PMV) caused to correspond to the motion vector on the basis of motion compensation mode, etc.

4 Claims, 18 Drawing Sheets

|   | MB0 | MB1 | MB2 |   |
|---|---|---|---|---|
| ... | (5,1)(1) | (5,5)(3) | (5,5)(5) | ... |
|   | (5,5)(2) | (5,5)(4) | (5,5)(6) |   |

DETERMINATION OF DIFFERENCE

PMV1 = ( 0,0 ) (INITIAL VALUE)
PMV2 = ( 0,0 ) (INITIAL VALUE)

| MB0 | (5,1)(1) - PMV1 = (5,1)  PMV1 = (5,1)(1) |
|---|---|
|   | (5,5)(2) - PMV2 = (5,5)  PMV2 = (5,5)(2) |
| MB1 | (5,5)(3) - PMV1 = (0,4)  PMV1 = (5,5)(3) |
|   | (5,5)(4) - PMV2 = (0,0)  PMV2 = (5,5)(4) |
| MB2 | (5,5)(5) - PMV1 = (0,0)  PMV1 = (5,5)(5) |
|   | (5,5)(6) - PMV2 = (0,0)  PMV2 = (5,5)(6) |

|   | MB0 | MB1 | MB2 |   |
|---|---|---|---|---|
| ... | (5,1)(1) | (0,4)(3) | (0,0)(5) | ... |
|   | (5,5)(2) | (0,0)(4) | (0,0)(6) |   |

FIG.7

|  | MB0 | MB1 | MB2 |  |
|---|---|---|---|---|
| ... | (5,1)(1) | (0,4)(3) | SKIP(5) | ... |
|  | (5,5)(2) | (0,0)(4) | MB(6) |  |

DETERMINATION OF
RECONSTRUCTED MOTION
VECTOR FROM DIFFERENCE

PMV1 = ( 0,0 ) (INITIAL VALUE)
PMV2 = ( 0,0 ) (INITIAL VALUE)

| MB0 | ( 5,1 )(1) + PMV1 = ( 5,1 ) → TO PMV1 |
|---|---|
|  | ( 5,5 )(2) + PMV2 = ( 5,5 ) → TO PMV2 |
| MB1 | ( 0,4 )(3) + PMV1 = ( 5,5 ) → TO PMV1 |
|  | ( 0,0 )(4) + PMV2 = ( 5,5 ) → TO PMV2 |
| MB2 | ( 5,5 )(5)  (PMV1 COPY) |
|  | ( 5,5 )(6)  (PMV2 COPY) |

FIG.8

|  | MB0 | MB1 | MB2 |  |
|---|---|---|---|---|
| ... | (5,1)(1) | (5,5)(3) | (5,5)(5) | ... |
|  | (5,5)(2) | (5,5)(4) | (5,5)(6) |  |

DETERMINATION OF DIFFERENCE

PMV1 = ( 0,0 ) (INITIAL VALUE)

| MB0 | ( 5,1 )(1) - PMV1 = ( 5,1 )  PMV1 = ( 5,1 )(1) |
|---|---|
|  | ( 5,5 )(2) - PMV1 = ( 0,4 )  PMV1 = ( 5,5 )(2) |
| MB1 | ( 5,5 )(3) - PMV1 = ( 0,0 )  PMV1 = ( 5,5 )(3) |
|  | ( 5,5 )(4) - PMV1 = ( 0,0 )  PMV1 = ( 5,5 )(4) |
| MB2 | ( 5,5 )(5) - PMV1 = ( 0,0 )  PMV1 = ( 5,5 )(5) |
|  | ( 5,5 )(6) - PMV1 = ( 0,0 )  PMV1 = ( 5,5 )(6) |

|  | MB0 | MB1 | MB2 |  |
|---|---|---|---|---|
| ... | (5,1)(1) | (0,0)(3) | (0,0)(5) | ... |
|  | (0,4)(2) | (0,0)(4) | (0,0)(6) |  |

FIG.18

|  | MB0 | MB1 | MB2 |  |
|---|---|---|---|---|
| ... | (5,1)(1) | (0,0)(3) | (0,0)(5) | ... |
|  | (0,4)(2) | (0,0)(4) | (0,0)(6) |  |

↓

DETERMINATION OF RECONSTRUCTED MOTION VECTOR FROM DIFFERENCE

PMV1 = (0,0) (INITIAL VALUE)

| MB0 | (5,1)(1) + PMV1 = (5,1)A → TO PMV1 |
|---|---|
|  | (0,4)(2) + PMV1 = (5,5)B → TO PMV1 |
| MB1 | (0,0)(3) + PMV1 = (5,5)C → TO PMV1 |
|  | (0,0)(4) + PMV1 = (5,5)D → TO PMV1 |
| MB2 | (0,0)(5) + PMV1 = (5,5) → TO PMV1 |
|  | (0,0)(6) + PMV1 = (5,5) → TO PMV1 |

FIG.19

METHOD OF CODING AND DECODING MOTION VECTOR AND APPARATUS THEREFOR, AND METHOD OF CODING AND DECODING PICTURE SIGNAL AND APPARATUS THEREFOR

This is a divisional of prior U.S. application Ser. No. 08/886,804 filed Jul. 2, 1997, now U.S. Pat. No. 5,946,042, which is a divisional of U.S. application Ser. No. 08/770,585 filed Dec. 19, 1996, now U.S. Pat. No. 5,701,164, which is a continuation of U.S. application Ser. No. 08/290,888 filed Dec. 8, 1994, now abandoned, which is a 371 of PCT/JP94/00473 filed Mar. 24, 1994.

TECHNICAL FIELD

This invention relates to a motion vector difference determination (calculation) method and a motion vector difference determination (calculation) element for determining (calculating) a difference between motion vectors by motion compensating prediction of a moving picture, a method for determination of reconstructed motion vector from difference and an element for determination of reconstructed motion vector from difference, and a moving picture coding apparatus and a moving picture decoding apparatus for coding and decoding a moving picture signal to which determination of difference and determination of reconstructed motion vector from difference are applied, respectively.

BACKGROUND ART

In the case of digitizing a signal of a moving picture to record and transmit digital data thus obtained, because its data quantity becomes very large, coding (compression) is implemented to the data. As a representative coding system, there is a motion compensating predictive coding.

The principle of motion compensating prediction is shown in FIG. 9. In FIG. 9, the motion compensating predictive coding is a method utilizing correlation in a time base direction of a picture signal. This method predicts a currently inputted picture (picture of current frame) from a known picture signal already decoded and reproduced (picture signal of past frame) to move the known picture signal decoded and reproduced (picture signal of past frame) in correspondence with motion of signal to transmit only motion information (motion vector MV) at that time and predictive error information at that time, thus to compress information quantity required for coding.

As a representative one of motion compensating predictive coding and decoding methods as described above, there is so called MPEG (Moving Picture Expert Group) 1. This MPEG1 is a popular name of the moving picture coding system which has progressed in WG (Working Group) 11 of SC (Sub Committee) 29 of JTC (Joint Technical Committee) 1 of so called ISO (International Standardization Organization) and IEC (International Electrotechnical Commission).

MPEG1 has intraframe and interframe coding processing, and the motion compensating predictive coding is used in the case of the interframe coding processing. An example of motion compensating prediction at this time is shown in FIG. 10. In FIG. 10, in the motion compensating prediction at this time, one frame (picture) is divided into small blocks (called macro blocks (MB) and each is comprised of 16 lines×16 pixels) to carry out motion compensating predictive coding in units of those small blocks. In the example of FIG. 10, as motion compensating prediction in the case of the interframe coding processing, forward prediction between, e.g., past frame present in the past in point of time and current frame and backward prediction between, e.g., future frame present in future in point of time and current frame are illustrated.

A more practical example of motion compensation at this time is shown in FIG. 11. Initially, as processing of the first stage, P picture (to be coded) indicated by P in the figure jumping over several pictures is predictive-coded by using I picture indicated by I in the figure or any other P picture. Such predictive coding operation is cyclically executed. Then, as processing of the second stage, B pictures indicated by B in the figure put between P pictures, I pictures or between picture and I picture are sequentially predictive-coded from P picture or I picture before and after those B pictures. It is to be noted that I picture is intraframe coded picture which is prepared without use of motion compensation. Further, arrows (except for arrow indicating direction of time t) in FIG. 11 indicate directions of motion predictions.

For motion compensation at the MPEG1, four kinds of modes described below exist in units of macroblock. Namely, there exist:

- mode of prediction from a frame present in the past in point of time as first motion compensation mode (forward predictive mode);
- mode of prediction from a frame present in future in point of time as second motion compensation mode (backward predictive mode);
- mode of linear prediction from both the past and future frames as third motion compensation mode (bidirectionally predictive mode) (i.e., predictive blocks from past frame and predictive blocks from future frame are caused to undergo mean value calculation every pixel); and
- mode having no motion compensation as fourth motion compensation mode (i.e., intra-coded mode).

Among these four kinds of motion compensation modes, in the P picture, an optimum one of the first and fourth motion compensation modes is selected in units of macroblocks. At this time, as past frame to which reference is made at the time of motion compensating prediction with respect to picture of current frame, one frame exists. Further, in the B picture, an optimum one of the first to fourth motion compensating modes is selected in units of macroblocks. At this time, as past frame and future frame to which reference is made at the time of motion compensating prediction with respect to picture of current frame, one frames respectively exist.

In the P picture and B picture, as motion vector in units of the macroblock, one motion vector which makes reference to the past frame exists in prediction in the first motion compensating mode. In prediction in the second motion compensating mode, one motion vector which makes reference to the future frame exists. In prediction in the third motion compensating mode, motion vectors which make reference to both past and future frames respectively exist.

In the MPEG1, motion vectors delivered in units of these macroblocks are caused to undergo determination (calculation) of difference by difference determination (calculation). element shown in FIG. 12 by making use of the fact that information of motion vector given in units of macroblocks have high spatial correlation, and difference information thus obtained is transmitted.

In more practical sense, at this difference determination element, terminal 404 is supplied with motion compensation mode signals given as four kinds of the first to fourth motion compensating modes, and terminal 401 is supplied with a motion vector signal currently inputted. The currently inputted motion vector signal is sent to common terminal of switch 406 and adding input terminal of difference circuit 405, and the motion compensating mode signal is sent to switcher 403.

Selected (switched) terminal a of the switch 406 is connected to input terminal of register 402a for past frame reference vector of register group 402, and selected terminal b is connected to input terminal of register 402b for future frame reference vector of register group 402. Further, output terminal of register 402a for past frame reference vector of register group 402 is connected to selected terminal a of switch 407, and output terminal of the register 402b for future frame reference vector is connected to selected terminal b of switch 407. These switches 406 and 407 are of a structure such that any one of the selected terminals a and b is selected in accordance with register switching signal S401 outputted from switcher 403 supplied with the motion compensating mode signal. An output of the switch 407 is sent to subtracting input terminal of the difference circuit 405.

Accordingly, the difference circuit 405 takes a difference between motion vector signal S402 which has been read out through the switch 407 from register group 402 in accordance with register switching signal S401 outputted from the switcher 403 and motion vector signal from the terminal 401. A difference by the difference circuit 405 is outputted from terminal 408 as a difference motion vector from the difference determination circuit.

The motion vector signal currently inputted is overwritten into register 402a or 402b designated by register switching signal S401 through the switch 406, and is newly stored thereinto.

As stated above, in the difference determination element, motion vectors making reference to past frame and motion vectors making reference to future frame are caused to independently undergo processing for determination of difference.

A more practical example of the operation of the above-described difference determination element is shown in FIG. 13. In this figure, X-component of (X, Y) of motion vector indicates motion in a horizontal direction and Y-component thereof indicates motion in a vertical direction. Positive values are given to motions spatially in right direction and in lower direction, and negative values are given to motions in left direction and in upper direction. In this example, (0, 0) is given as an initial value at the time of determination of difference. Further, in this figure, FMV represents past frame reference motion vector, and BMV represents future frame reference motion vector. In addition, in this figure, mode (1) represents motion compensation mode of forward prediction, mode (2) represents motion compensation mode of backward prediction, and mode (3) represents motion compensation mode of bidirectional prediction.

Namely, in FIG. 13, e.g., when motion compensation mode of small block at the left end of the figure is mode (3), past frame reference motion vector FMV is (10, 10), and future frame reference motion vector BMV is (8, 8), if motion vector in small block of mode (1) adjacent on the right side is (8, 5), difference motion vector becomes equal to (−2, −5) of (8, 5)−(10, 10), and if motion vector in small block of mode (1) adjacent on the right side is (7, 6), difference motion vector becomes equal to (−1, 1) of (7, 6)−(8, 5). Further, if motion vector in small block of mode (2) adjacent on the right side is (9, 10), difference motion vector becomes equal to (1, 2) of (9, 10)−(8, 8), and if input motion vectors in small block of the mode (3) adjacent on the right side are (5, 4) and (8, 9), difference motion vectors thereof become equal to (−2, −2) of (5, 4)−(7, 6) and (−1, −1) of (8, 9)−(9, 10).

An inverse difference determination element for reconstructing motion vector from motion vector caused to be represented by difference vector, which is a configuration complementary to the difference determination element shown in FIG. 13, is shown in FIG. 14.

In more practical sense, in the inverse difference determination element, terminal 414 is supplied with motion compensation mode signals given as four kinds of the first to fourth motion compensating modes, and terminal 408 is supplied with the difference motion vector signal currently inputted. The difference motion vector signal is sent to one adding input terminal of adding circuit 409, and the motion compensation mode signal is sent to switcher 413.

Further, selected terminal a of switch 411 is connected to output terminal of register 410a for past frame reference vector of register group 410, and selected terminal b is connected to output terminal of register 410b for future frame reference vector. This switch 411 is of a structure such that any one of the selected terminals a and b is selected in accordance with register switching signal S403 outputted from switcher 413 supplied with the motion compensation mode signal. Common terminal of the switch 411 is connected to the other adding input terminal of the adding circuit 409.

Accordingly, the adding circuit 409 takes an addition of motion vector signal S404 which has been read out through the switch 411 from register group 410 in accordance with register switching signal S403 outputted from the switcher 413 and difference motion vector signal from the terminal 408. An addition output of the adding circuit 409 is outputted from terminal 415 as reconstructed motion vector signal from the inverse difference determination element.

Further, the reconstructed motion vector signal from the adding circuit 409 is sent also to common terminal of switch 412. This switch 412 is of a structure such that any one of selected terminals a and b is selected on the basis of the register switching signal S403. Selected terminal a is connected to register 410a for past frame reference vector of the register group 410 and selected terminal b is connected to register 410b for future frame reference vector.

For this reason, information of the reconstructed motion vector is overwritten, through the switch 412, into register 410a or 410b designated by the register switching signal S403, and is newly stored thereinto.

Meanwhile, since the above-mentioned MPEG1 is moving picture coding method suitable for non-interlaced picture, it cannot be said that the MPEG1 is necessarily suitable for coding of interlaced signal such as so called NTSC system or PAL system, etc. which is a television signal. This was problem.

For this reason, in recent years, there has been proposed a system of implementing efficient motion compensating predictive coding to interlaced signal in the MPEG2 as successor to the MPEG1. In this system, as shown in FIG. 15, a method of adaptively carrying out switching between unit for handling picture in frame and that in field is adopted. In FIG. 15, fr indicates frame, fi indicates field, arrow FRP indicates prediction of frame base, and arrow FIP indicates prediction of field base.

At this time, in the MPEG2, in the case where the picture structure is frame, there is adopted a method of adaptively switching whether motion compensating prediction is carried out by macroblock of frame base or macroblock of field base.

Further, in the MPEG2, there is adopted a method in which macroblock is divided into areas of 16 pixels×8 lines of the upper portion and the lower portion as occasion demands to independently carry out motion compensating prediction in respective areas.

At this time, the number of motion vectors given in units of macroblocks is as follows. Namely, in the previously described prediction of the first motion compensating mode, one or more motion vectors which makes reference to past frame (or field) exist; in the prediction of the second motion compensating mode, one or more motion vectors which makes reference to future frame (or field) exist; and in the prediction of the third motion compensating mode, one or more motion vectors which make reference to both frames (or fields) of past and future respectively exist. The numbers of motion vectors in respective motion compensating modes are varied in units of macroblocks.

As stated above, as the motion compensating prediction method in the MPEG2, systems more complex than the MPEG1 are proposed. Followed by this, there result increased kinds of motion vectors at that time as compared to the MPEG1. Under such circumstances, two problems exist in handling these motion vectors.

Namely, the first problem is that method used in the MPEG1 cannot be applied in encoding motion vector. For this reason, various proposals have been made. They are laid open to public inspection, e.g., on P.32, P.44, P.145, P.148 of ISO-IEC/JTC1/SC29/WG11 MPEG93/225b Test Model 4 (laid open on February 1993).

However, it cannot be said that these proposals support all the motion compensating modes, and they are therefore insufficient up to now. Further, these proposals have the drawback that they cannot solve the second problem described below.

The second problem resides in that handling of skipped macroblock is not clearly shown.

Here, skipped macroblocks in the MPEG1 are macroblocks as featured below: Namely, they are characterized in that;

first, skipped macroblock at P picture
there is no motion compensation error signal to be transmitted (condition a__1e),
motion compensation mode is forward prediction (condition a__2e), and
the value of motion vector is zero (condition a__3e);
secondly, skipped macroblock at B picture
there is no motion compensation error signal to be transmitted (condition b__1e),
motion compensation mode is the same as macroblock transmitted immediately before (condition b__2e), and
the value of motion vector caused to be difference vector obtained by difference determination element shown in FIG. 12 is zero (condition b__3e).

Further, in the decoder, skipped macroblocks will be dealt in the MPEG1 as follows: Namely, in the MPEG1, skipped macroblocks are handled in such a manner that first, processing of skipped macroblocks at P picture is that
motion compensation error signal which has been transmitted is considered to be zero (condition a__1d),
motion compensation mode is caused to be forward prediction (condition a__2d), and
the value of motion vector is set to zero (condition a__3d),
secondly, processing of skipped macroblocks at B picture is that
motion compensation error signal which has been transmitted is considered to be zero (condition b__1d),
motion compensation mode of a macroblock received immediately before is required to be copied (condition b__2d), and
motion vector of a macroblock received immediately before is required to be copied (condition b__3d).

Simply in other words, in the MPEG1, decoding processing of skipped macroblock at P picture is copy from past picture, and decoding processing of skipped macroblocks at B picture is copy from macroblock adjacent on the left side decoded immediately before within the same frame.

As described above, in the MPEG1, with respect to macroblock which is skipped macroblock, the encoder transmits no data. As stated above, the skipped macroblock is important coding technology in view of improvement in coding efficiency. For example, in the case where even if a picture to be processed is a sequence of moving pictures, its content is a scene where still pictures (pictures having very gentle motion) are successive, most macroblocks can be dealt as skipped macroblocks. In the extreme case, there may be employed a procedure to encode the first frame within picture without motion compensation to transmit coded frame information, thus permitting macroblocks from the second frames and frames succeeding thereto to be almost handled as skipped macroblocks. In this case, great improvement of coding efficiency can be expected.

From facts as described above, method for encoding motion vector in motion compensating prediction of the previously described MPEG2 is required to be a method in which handling of skipped macroblock is taken into consideration as well.

However, in the case of methods of encoding motion vector conventionally proposed to the MPEG2, handling of skipped macroblock is not taken into consideration. For this reason, those methods disadvantageously fail to handle skipped macroblocks.

For example, an example of the problem will now be described on the basis of configuration of difference determination element of FIG. 16. This is the method described in ISO-IEC/JTC1/SC29/WG11 MPEG93/225b Test Model 4 of the previously described material.

In FIG. 16, terminal 504 is supplied with mode information of forward, backward or bidirectional prediction as mode signal of motion compensation, information indicating frame prediction or field prediction, etc. as prediction type signal which will be described later, and information indicating frame structure, field structure or progressive as picture structure signal, and is further supplied, in addition to the above, with information indicating the first field (field 1, i.e., e.g., odd field) or the second field (field 2, i.e., e.g., even field) as field motion vector parity signal, information similarly indicating the first field or the second field as predicted field parity signal, and information indicating P picture or B picture as picture coding type signal. In addition, terminal 501 is supplied with a motion vector signal currently inputted.

The signal which has been delivered to the terminal 504 is sent to switcher 503. Further, the currently inputted motion vector signal is sent to common terminal of switch 506 through scale converter 509 for implementing a predetermined scale conversion B to the currently inputted motion vector on the basis of scale indication signal SCB from the switcher 503, and is directly sent to adding input terminal of difference circuit 505.

The switch 506 has selected terminals a to d. Selected terminal a is connected to input terminal of register memory PMV1 of register memory group 502 for storing motion vector which will be described later; selected terminal b is connected to input terminal of register memory PMV2 of register group 502; selected terminal c is connected to input terminal of register memory PMV3; and selected terminal d is connected to input terminal of register memory PMV4. Further, output terminal of register memory PMV1 of register memory group 502 for storing motion vector is connected to selected terminal a of switch 507; output terminal of register memory PMV2 is connected to selected terminal b of switch 507; output terminal of register memory PMV3 is connected to selected terminal c of switch 507; and output terminal of register memory PMV4 is connected to selected terminal d of switch 507. These switches 506 and 507 are of a structure such that any one of the selected terminals a to d is selected in accordance with register switching signal outputted from the switcher 503.

An output of the switch 507 is sent to subtracting input terminal of the difference circuit 505 through scale converter 510 for implementing a predetermined scale conversion A on the basis of scale indication signal SCA from the switcher 503. The difference circuit 505 takes a difference between information from the scale converter 510 and motion vector signal from the terminal 501. The difference obtained by this difference circuit 505 is outputted from terminal 508 as difference motion vector signal from the difference determination element.

Further, information of the currently inputted motion vector is overwritten, through the scale converter 509 and through the switch 506, into any one of register memories PMV1~PMV4 designated by register switching signal, and is newly stored thereinto.

As stated above, in the difference determination element for determining difference between motion vectors shown in FIG. 16, register memory group 502 comprised of four register memories PMV1~PMV4 for storing the motion vector signal is prepared.

The operation of register memory group 502 for storing motion vector will now be described.

In ISO-IEC/JTC1/SC29/WG11 MPEG93/225b Test Model 4, in the case of P picture, it has been proposed to use respective register memories PMV1~PMV4 of register memory group 502 of FIG. 16 in a manner described below.

Namely, for example, information of forward motion vector in which reference picture (picture which serves as reference of predictive picture) is the first field and predicted field with respect thereto (field which is to be coded from now on) is the first field is stored into register memory PMV1. Further, information of forward motion vector in which reference picture is the second field and predicted field is the first field is stored into register memory PMV2. Information of forward motion vector in which reference picture is the first field and predicted field is the second field is stored into register memory PMV3. In addition, information of forward motion vector in which reference picture is the second field and predicted field is the second field is stored into register memory PMV4. Namely, in the P picture, the relationship between motion vector signals and respective register memories in which they are stored was determined by combinations of reference pictures and fields to be predicted.

On the other hand, in ISO-IEC/JTC1/SC29/WG11 MPEG93/225b Test Model 4, in the case of B picture, it has been proposed to use respective register memories PMV1~PMV4 of FIG. 16 in a manner described below.

Namely, for example, two register memories PMV are prepared for forward motion vector. For example, information of forward motion vector in which reference picture is the first field is stored into register memory PMV1, and information of forward motion vector in which reference picture is the second field is stored into register memory PMV2. Further, two register memories PMV are prepared for backward motion vector as well. Information of backward motion vector in which reference picture is the first field is stored into register memory PMV3, and information of backward motion vector in which reference picture is the second field is stored into register memory PMV4. Namely, in the B picture, irrespective of whether a field to be predicted is the first field or the second field, motion vector signals in which reference picture and direction of prediction are the same were stored into the same register memory.

In the difference determination element shown in FIG. 16, in allowing the currently inputted motion vector to be difference vector, an approach is employed to take out the value of register memory PMV corresponding to that motion vector (i.e., PMV in which a motion vector having parity of reference picture and predicted field which are the same as the motion vector is stored in the case where that motion vector is used for coding of P picture; and, PMV in which a motion vector having parity of reference picture and direction of prediction which are same as the motion vector is stored in the case where that motion vector is used for coding of B picture) to implement a predetermined scale conversion A by scale converter 510 thereto as occasion demands (in accordance with scale indication signal SCA) thereafter to carry out calculation between the scale converted value A and the above-mentioned currently inputted motion vector by difference circuit 505. Further, scale conversion B is implemented to the value of the currently inputted motion vector by scale converter 509 as occasion demands thereafter to overwrite it into any one of register memories PMV selected and subjected to reference at the time of determination of difference motion vector as described above although not illustrated to newly store it thereinto. Difference determination element is constructed in this way.

FIG. 17 shows an inverse difference determination element corresponding to difference determination element for motion vector of FIG. 16.

In the inverse difference determination element shown in FIG. 17, terminal 524 is supplied with motion compensation mode signal, prediction type signal, picture structure signal, field motion vector parity signal, predicted field parity signal, and picture coding type signal. In addition, terminal 518 is supplied with the currently inputted difference motion vector signal.

Information through the terminal 524 is sent to switcher 523, and the difference motion vector is sent to one adding input terminal of adding circuit 519.

Further, selected terminal a of switch 521 is connected to output terminal of register memory PMV1 of motion vector storage register memory group 520 for carrying out storage similar to that of motion vector storage register memory group 502 of FIG. 16; selected terminal b is connected to output terminal of register memory PMV2; selected terminal c is connected to output terminal of register memory PMV3; and selected terminal d is connected to output terminal of register memory PMV4. This switch 521 is of a structure such that any one of selected terminals a to d is selected in accordance with register switching signal from the switcher 523. Common terminal of this switch 521 is connected to the other adding input terminal of the adding circuit 519 through scale converter 529 for implementing a predetermined scale conversion C to a signal delivered on the basis of scale indication signal SCC from the switcher 123.

Accordingly, the adding circuit 519 takes an addition of motion vector signal passed through the switch 521 from register memory group 520 in accordance with register switching signal outputted from the switcher 523 and further through scale converter 529 and difference motion vector signal from the terminal 518. An addition output of the adding circuit 519 is outputted from terminal 525 as reconstructed motion vector from the inverse difference determination element.

Further, the reconstructed motion vector signal from the adding circuit 519 is sent also to common terminal of switch 522 through scale converter 530 for implementing a predetermined scale conversion D to a signal delivered on the basis of scale indication signal SCD from the switcher 523. This switch 522 is of a structure such that any one of selected terminals a~d is selected on the basis of the register switching signal. In this switch 522, selected terminal a is connected to input terminal of register memory PMV1 of the register memory group 520, selected terminal b is connected to input terminal of register memory PMV2, selected terminal c is connected to input terminal of register memory PMV3, and selected terminal d is connected to input terminal of register memory PMV4.

Thus, information of the reconstructed motion vector is overwritten and is newly stored into any one of register memories PMV1~PMV4 designated by the register switching signal through the switch 522.

Namely, in the inverse difference determination element of FIG. 17, the value stored in register memory PMV corresponding to inputted difference motion vector (i.e., PMV in which reconstructed motion vector having parity values of reference picture and predicted field which are the same as the. difference motion vector is stored in the case where difference motion vector is used for decoding of P picture, or PMV in which reconstructed motion vector having reference picture parity and direction of prediction which are the same as the difference motion vector is stored in the case where difference motion vector is used for decoding of B picture) corresponding to inputted differential motion vector is taken out to implement scale conversion C to that value by using scale converter 529 as occasion demands thereafter to carry out an addition calculation of that scale converted value and the currently inputted difference motion vector by using adding circuit 519, thus to reconstruct motion vectors corresponding to original motion vector. The reconstructed motion vector is caused to undergo scale conversion D by scale converter 530 as occasion demands thereafter to overwrite and newly store the scale converted value into any one of register memories PMV1~PMV4 selected and subjected to reference at the time of reconstruction of motion vector. Inverse difference determination element is constructed in this way.

An example of operation in the difference determination element of FIG. 16 at B picture will now be described with reference to FIG. 18.

In FIG. 18, with respect to macroblock (small block) MB1, it is assumed that there is no predictive error signal to be transmitted (the above-mentioned condition b__1e is satisfied). Further, macroblocks MBO and MB1 are assumed to have the same forward prediction mode (the above-mentioned condition b__2e is satisfied).

At this time, it is assumed that, as the first example, picture structure is field structure and predicted field parity is the first field (predicted field is the first field). The prediction type is 16×8 Field based prediction in the case of respectively independently carrying out prediction with respect to the area of 16 pixels×8 lines of the upper portion and the area of 16 pixels×8 lines of the lower portion. In the example of FIG. 18, for example, motion vector of the upper portion of macroblock MB0 is $(5, 1)_{(1)}$, motion vector of the lower portion of macroblock MB0 is $(5, 5)_{(2)}$, motion vector of the upper portion of macroblock MB1 is $(5, 5)_{(3)}$, motion vector of the lower portion of macroblock MB1 is $(5, 5)_{(4)}$, motion vector of the upper portion of macroblock MB2 is $(5, 5)_{(5)}$, and motion vector of the lower portion of macroblock MB2 is $(5, 5)_{(6)}$.

Further, it is assumed that all motion vectors of macroblocks MB0 and MB1 make reference to the same first field. In this case, since parity of reference picture and direction of prediction are the same with respect to all motion vectors, differences between motion vectors stored in register memory PMV1 of FIG. 16 are taken to transmit difference motion vector. It is assumed that (0, 0) is stored as an initial value in register memory PMV1 of FIG. 16.

Namely, in the case of the example of FIG. 18, in macroblock MB0, $(5, 1)_{(1)}$–PMV1=(5, 1) which is a difference between motion vector $(5, 1)_{(1)}$ of the upper portion and initial value (0, 0) of register memory PMV1 is obtained. The value thus obtained is outputted as difference motion vector of the upper portion of MB0. The motion vector $(5, 1)_{(1)}$ is stored into register memory PMV1. Further, $(5, 5)_{(2)}$–PMV1=(0, 4) which is a difference between motion vector $(5, 5)_{(2)}$ of the lower portion and value (5, 1) of register memory PMV1 is obtained. The value thus obtained is outputted as difference motion vector of the lower portion. The motion vector $(5, 5)_{(2)}$ is stored into register memory PMV1. Then, by similarly taking a difference also with respect to macroblock MB1, difference motion vectors all become equal to zero (0, 0) in the macroblock MB1. (The above-mentioned condition b__3e is satisfied).

Further, as the second example, when condition b__1e and condition b__2e are satisfied as previously described, the picture structure is assumed to be frame structure. The prediction type is assumed to be Field based prediction for respectively independently predicting the first field and the second field of macroblock MB (predicted field is assumed to be the first field and the second field). Further, it is assumed that the first field of macroblock MB0 is $(5, 1)_{(1)}$, motion vector of the second field is $(5, 5)_{(2)}$, motion vector of the second field of macroblock MB1 is $(5, 5)_{(3)}$, motion vector of the second field is $(5, 5)_{(4)}$, motion vector of the second field of macroblock MB2 is $(5, 5)_{(5)}$, and motion vector of the second field is $(5, 5)_{(6)}$.

In addition, all motion vectors of macroblock MB0 and macroblock MB1 are assumed to make reference to the same first field. Also in this case, since parity of reference picture and predictive direction are the same with respect to all motion vectors, differences between motion vectors stored in register memory PMV1 of FIG. 16 are taken to transmit difference motion vector. Thus, also in this example, the method of taking difference is the same as that of FIG. 18. In macroblock MB1, difference motion vectors all become equal to zero (0, 0) (condition b__3e is satisfied).

From facts as described above, in the above-described two examples, in accordance with the rule at the MPEG1, the above-mentioned conditions b__1e, b__2e, b__3e are satisfied in macroblock MB1. Accordingly, it is now assumed that encoder has processed this macroblock MB1 as skipped macroblock.

In this case, however, that is an erroneous selection. This is because, on the decoder side, processing of the above-mentioned conditions b__1d and b__2d are correctly carried out, but copy is carried out although motion vectors of macroblocks MB0 and MB1 are actually different. Namely, if macroblock MB1 is judged to be skipped macroblock, in the case of the former example, although motion vector $(5, 1)_{(1)}$ of the upper portion of macroblock MB0 and motion vector $(5, 5)_{(3)}$ of the upper portion of macroblock MB1 are different $(5, 1)_{(1)} \neq (5, 5)_{(3)}$, copy of motion vector from macroblock MB0 to macroblock MB1 is carried out. As a result, decoding is not correctly carried out. Further, also in the case of the latter example, although motion vector $(5, 1)_{(1)}$ of the first field of macroblock MB0 and motion vector $(5, 5)_{(3)}$ of the first field of macroblock MB1 are actually different, an erroneous copy is carried out.

This problem results from the fact that, in the prior art, in B picture, in allowing motion vectors within the same macroblock to be difference motion vector to transmit it, the same register memory (PMV) is used twice or more to update the content thereof.

Further, the fact that the same register memory (PMV) is used twice or more with respect to motion vector within the same macroblock further gives rise to problems as described below on the decoder side.

FIG. 19 shows the operation for reconstructing motion vector from difference motion vector transmitted with respect to B picture. It is to be noted in this example that picture structure is field structure, and macroblocks MB0, MB1, MB2 are encoded in the forward predictive mode respectively independently in the area of 16 pixels×8 lines of the upper portion and the area of 16 pixels×8 lines of the lower portion. In addition, it is assumed that the area of 16 pixels×8 lines of the upper portion and the area of 16 pixels×8 lines of the lower portion are caused to be both single first field.

In the example of FIG. 19, since the area of the upper portion and the area of the lower portion have the same parity of reference picture and the same direction of prediction, e.g., only register memory PMV1 is used, so the content of that register memory PMV1 varies within the same macroblock. For this reason, in order to hold motion vector of macroblock processed immediately before, it is necessary to have additional four register memories (respective two register memories for forward and backward vectors) except for the register memories PMV. It is to be noted that the method of holding motion vector of macroblock immediately before is frequently carried out also with a view to carrying out error correction, etc. on the decoder side.

Namely, in FIG. 19, it is assumed that, as difference motion vector obtained from the configuration of FIG. 18, $(5, 1)_{(1)}$ of difference motion vector of the upper portion of macroblock MB0, $(0, 4)_{(2)}$ of difference motion vector of the lower portion of macroblock MB0, $(0, 0)_{(3)}$ of difference motion vector of the upper portion of macroblock MB1, $(0, 0)_{(4)}$ of difference motion vector of the lower portion of macroblock MB1, $(0, 0)_{(5)}$ of difference motion vector of the upper portion of macroblock MB2, and $(0, 0)_{(5)}$ of difference motion vector of the lower portion of macroblock MB2 are obtained. Further, it is assumed that (0, 0) is stored as an initial value in the register memory PMV1.

In the case of the example of FIG. 19, in macroblock MB0, $(5, 1)_{(1)}$+PMV1=$(5, 1)_A$ by addition of difference motion vector $(5, 1)_{(1)}$ of the upper portion and initial value (0, 0) of register memory PMV1 is obtained as reconstructed motion vector. This reconstructed motion vector is sent to register memory PMV1. Further, at the lower portion of macroblock MB0, $(0, 4)_{(2)}$+PMV1=$(5, 5)_B$ by addition of the difference motion vector $(0, 4)_{(2)}$ of the lower portion and reconstructed motion vector into the register memory PMV1 is obtained as reconstructed motion vector. This reconstructed motion vector is sent to register memory PMV1. Similarly, in macroblock MB1, $(0, 0)_{(3)}$+PMV1=$(5, 5)_C$ by addition of difference motion vector $(0, 0)_{(3)}$ of the upper portion and reconstructed motion vector $(5, 5)_B$ into the register memory PMV1 is obtained as reconstructed motion vector. This reconstructed motion vector is sent to register memory PMV1. Further, at the lower portion of this macroblock MB1, $(0, 0)_{(4)}$+PMV1=$(5, 5)_D$ by addition of difference motion vector $(0, 0)_{(4)}$ of the lower portion and reconstructed motion vector $(5, 5)_C$ into the register memory PMV1 is obtained as reconstructed motion vector. This reconstructed motion vector is sent to register memory PMV1. As stated above, since reconstructed motion vectors thus obtained are sequentially overwritten into register memory PMV1, reconstructed motion vector of macroblock immediately before disappears.

As stated above, on the decoder side, in order to hold the value of motion vector reconstructed in macroblock MB immediately before, it is necessary to additionally have two register memories PMV with respect to one direction of prediction, and to store, e.g., values of the motion vectors $(5, 1)_A$ and $(5, 5)_B$ in the macroblock MB0 and values of the motion vectors $(5, 5)_C$ and $(5, 5)_D$ in the macroblock MB1.

As described above, in the conventional method of coding motion vector proposed to the MPEG2, no consideration is made in connection with handling of skipped macroblock. For this reason, this coding method has the problem that it is unable to handle skipped macroblock.

Further, on the decoder side, in order to hold motion vector of macroblock processed immediately before, it is necessary to have register memories in addition to the register memories PMV, thus allowing the configuration of inverse difference determination element for vector (difference motion vector) to be complicated.

In addition, in the prior art, control for switching between register memories PMV at vector difference determination element and/or inverse difference determination element is complicated, resulting in the problem that hardware scale of switcher of register memories PMV is large.

DISCLOSURE OF THE INVENTION

Thus, attention is drawn to the drawbacks described above in this invention, and, on the encoder side, one object of this invention is to provide a difference determination element for determining difference between motion vectors by a configuration simpler than that in the prior art and another object is to provide a method for judging skipped macroblock in the case where with respect to motion vectors given in units of macroblocks in motion compensating predictive coding and decoding apparatuses for moving picture, there exist one or more motion vectors which make reference to past frame (or field) in the forward prediction, there exist one or more motion vectors which make reference to future frame (or field) in the backward prediction, and there exist one or more motion vectors which make reference to both past and future frames (or fields) in the bidirectional prediction, and in the case where the numbers of motion vectors in respective motion compensation modes vary in units of macroblocks.

Further, on the decoder side, an object of this invention is to provide an inverse difference determination element for reconstructing motion vector from received difference motion vector by a configuration simpler than that in the prior art, the inverse difference determination element being characterized in that there is no necessity of having register memory except for register memories PMV in order to hold motion vector of macroblock processed immediately before, and another object is to provide a method of handling skipped macroblock on the decoder side.

This invention is directed to a method and an apparatus for coding motion vector of macroblock coded in the forward predictive mode, the backward predictive mode or the bidirectional predictive mode. In accordance with the method and the apparatus for coding motion vector, a scheme is employed to detect order of transmission of current motion vectors in a predetermined direction within one macroblock to select, on the basis of the detected order of transmission, one of L number of memories for motion vector in a predetermined direction to read out former motion vector in the predetermined direction to subtract the former motion vector in the predetermined direction from the current motion vector in the predetermined direction, thus to generate a current difference motion vector in the predetermined direction.

Further, this invention is directed to a method and an apparatus for reconstructing difference motion vector of macroblock coded in the forward predictive mode, the backward predictive mode or the bidirectional predictive mode. In the method and the apparatus for reconstructing difference motion vector, order of reception within macroblock of received difference motion vectors in a predetermined direction is detected to select one of L number of memories for motion vector in predetermined direction on the basis of the detected order of reception to read out reconstructed motion vector in predetermined direction already reconstructed to add the difference motion vector in predetermined direction and the reconstructed motion vector in predetermined direction already reconstructed to generate a new reconstructed motion vector in predetermined direction.

In addition, this invention is directed to a method and an apparatus for coding picture signal. In the method and apparatus for coding picture signal, an input picture signal is coded every macroblock on the basis of a plurality of modes whereby when picture coding type in the plurality of modes is P picture, and picture structure in the plurality of modes is field structure, judgment is made every coded macroblock as to whether or not there are satisfied the conditions where predictive error signal is zero, motion vector is zero, motion compensation mode in the plurality of modes is the forward prediction, prediction type in the plurality of modes is field prediction of 16×16, and field motion vector reference parity of macroblock is the same as parity of predicted field, thus to process coded macroblock as skipped macroblock when the conditions are satisfied.

In the case where picture coding type in the plurality of modes is P picture, and picture structure in the plurality of modes is frame structure, judgment is made every coded macroblock whether or not there are satisfied the conditions where predictive error signal is zero, motion vector is zero, motion compensation mode in the plurality of modes is the forward prediction, and prediction type in the plurality of modes is frame prediction, thus to process coded macroblock as skipped macroblock when the conditions are satisfied.

Further, in the case where picture coding type in the plurality of modes is B picture, and picture structure in the plurality of modes is field structure, judgment is made every coded macroblock whether or not there are at least satisfied the conditions where predictive error signal is zero, difference motion vector is zero, motion compensation mode in the plurality of modes is the same as that of the former macroblock, and prediction type in the plurality of modes is field prediction of 16×16, thus to process coded macroblock as skipped macroblock when the conditions are satisfied.

In addition, in the case where picture coding type in the plurality of modes is B picture, and picture structure in the plurality of modes is frame structure, judgment is made every coded macroblock whether or not there are satisfied the conditions where predictive error signal is zero, difference motion vector is zero, motion compensation mode in the plurality of modes is the same as that of former macroblock, and prediction type in the plurality of modes is frame prediction, thus to process coded macroblock as skipped macroblock when the conditions are satisfied.

This invention is directed to a method and an apparatus for decoding picture signal. In the method and the apparatus for decoding picture signal, skipped macroblock is detected from coded picture signal, whereby when picture coding type of skipped macroblock is P picture, and picture structure is field structure, all memories in an element for determination of reconstructed motion vector from difference are reset to zero, thus to carry out decoding under the conditions where coded block signal is zero, motion vector is zero, motion compensation mode is forward prediction, prediction type is field prediction of 16×16, and field motion vector reference parity is the same parity as predicted field.

In the case where picture coding type of the skipped macroblock is P picture and picture structure is frame structure, all memories in element for determination of reconstructed motion vector from difference are reset to zero, thus to carry out decoding under the conditions where coded block signal is zero, motion vector is zero, motion compensation mode is forward prediction, and prediction type is frame prediction.

Further, in the case where picture coding type of the skipped macroblock is B picture, and picture structure is field structure, a scheme may be employed to carry out decoding at least under the conditions where coded block signal is zero, motion vector takes value stored in memory of element for determination of reconstructed motion vector from difference, motion compensation mode is motion compensation mode of macroblock decoded immediately before, and prediction type is field prediction of 16×16.

In addition, in the case where picture coding type of the skipped macroblock is B picture, and picture structure is frame structure, a scheme may be employed to carry out decoding under the conditions where coded block signal is zero, motion vector takes value stored in memory of element for determination of reconstructed motion vector from difference, motion compensation mode is motion compensation mode of macroblock decoded immediately before, and prediction type is frame prediction.

In accordance with this invention, in the configuration of difference determination element for motion vector, register memories for storing motion vectors are prepared so that its number becomes equal to the number equal to sum (N+M) of maximum transmission number N of forward motion vectors and maximum transmission number M of backward motion vectors within macroblock to give indices of 1~N in order of transmission of forward motion vectors within macroblock and to give indices of (N+1)~(N+M) in order of transmission of backward motion vectors within macroblock to allow vectors having respective indices and the register memories to have one-to-one correspondence relationship, whereby in allowing motion vectors within the same macroblock to be difference motion vector to transmit it, there is no possibility that the same register memory (PMV) is used twice or more.

Further, in the configuration of inverse difference determination element for reconstructing motion vector from difference motion vector, register memories for storing reconstructed motion vector are prepared so that its number is equal to the number equal to sum (M+N) of maximum reception number N of forward difference motion vectors and maximum reception number M of backward difference motion vectors within macroblock to give indices of 1~N in order of reception of forward difference motion vectors and to give indices of (N+1)~(N+M) in order of reception of backward difference motion vectors within macroblock to allow difference motion vectors having respective indices and the register memories to have one-to-one correspondence relationship, thus causing any register except for register memories (PMV) to become unnecessary.

BRIEF DESCRIPTION OF THE DRAWINGS

FIG. 7 is a view for explaining more practical configuration of difference vector in the picture signal decoding apparatus of this invention.

FIG. 8 is a view for explaining an actual example for reconstructing motion vector from difference motion vector in the picture signal decoding apparatus of this invention.

FIG. 18 is a view for explaining the problem of conventional difference determination element for motion vector.

FIG. 19 is a view for explaining an actual example for reconstructing motion vector from difference motion vector.

BEST MODE FOR CARRYING OUT THE INVENTION

Figure 1:
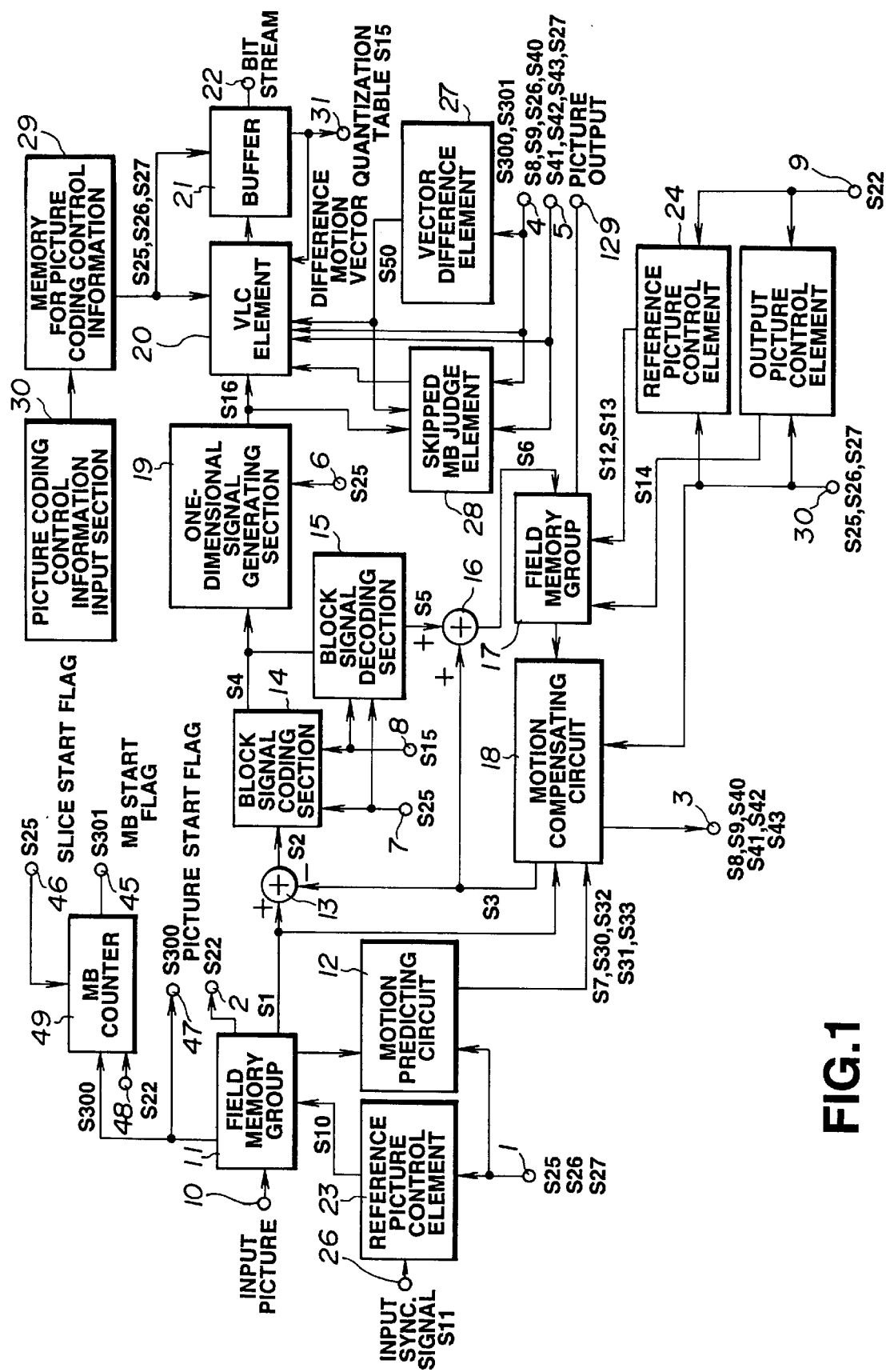
FIG. 1 is a circuit diagram showing, in a block form, outline of the configuration of an encoder used in a picture signal coding apparatus of this invention.

A moving picture coding apparatus (encoder) according to this invention will be first described with reference to FIG. 1.

Information for controlling basic operation of the encoder according to this invention is given from a picture coding control information input section 30, and is stored in picture coding control information storage memory 29. These information are picture frame size, output bit rate of coding information, and the like. These information are outputted from the memory 29 as picture coding control signal S25. Further, picture structure signal S26 (signal for discriminating whether picture structure is frame structure, field structure or progressive) is outputted through the memory 29 from the picture coding information input section 30, and picture coding type signal S27 (signal for discriminating whether picture type is I picture, P picture or B picture) is also outputted therefrom.

Moreover, a picture signal inputted from picture input terminal 10 is delivered to a field memory group 11. Further, a vertical synchronizing (sync.) signal S11 which is an input picture synchronizing signal is delivered from input terminal 26, and is then delivered to a reference picture control element 23. To the reference picture control element 23, the picture coding control signal S25, picture structure signal S26, and picture coding type signal S27 are also delivered through terminal 1. When this reference picture control element 23 receives the vertical synchronizing signal S11, it outputs reference picture indication signal S10 which will be described later, and delivers it to field memory group 11.

A picture of a picture signal which has been delivered to the field memory group 11 is a picture to be currently coded. In synchronism with the leading portion of picture which is read out from the field memory group 11, the field memory group 11 sets or raises picture start flag S22 which will be described later to deliver it to reference picture control element 24 through terminals 2 and 9. The reference picture control element 24 outputs reference picture indication signals S12, S13 which will be described later when picture start flag S22 is set to deliver them to field memory group 17. Further, picture start flag S22 caused to be supplied through the terminal 9 is delivered also to an output picture control element 25. The output picture control element 25 outputs output picture indication signal S14 which will be described later when the picture start flag S22 is set to deliver it to field memory group 17. In this embodiment, picture coding control signal S25, picture structure signal S26, and picture coding type signal S27 are delivered to the reference picture control element 24 and the output picture control element 25 through terminal 30.

Further, a picture signal which has been delivered to the field memory group 11 is sent to a motion predicting circuit 12, and the picture coding control signal S25, picture structure signal S26, and picture coding type signal S27 from the terminal 1 are delivered to the motion predicting circuit 12. This motion predicting circuit 12 implements motion prediction of pixels in a picture to be currently coded to picture signal which has been delivered to the field memory group 11 by making reference to past picture and future picture. The above-mentioned motion prediction is block matching of a block pixel signal in a picture which is to be currently coded and past picture or future picture to which reference is made, and the size of block is, e.g., 16×16 pixels, 16×8 pixels or 8×8 pixels.

Past and future reference pictures at this time are designated from field memory group 11 in accordance with reference picture indication signal S10 of motion prediction outputted from reference picture control element 23. The motion predicting circuit 12 detects each block position in reference picture in which predictive error in block matching becomes minimum with respect to respective selectable motion compensation modes to deliver motion vector corresponding to that position as motion vector signal S7 to motion compensating circuit 18. It is to be noted that which motion compensating mode can be selected is determined by picture structure signal S26 and picture coding type signal S27.

Further, the motion predicting circuit 12 delivers, to motion compensating circuit 18, prediction type signal S30, field motion vector reference parity signal S31, sub-motion vector signal S32, and predicted field parity signal S33 as additional information of the motion vector signal S7 as well.

In this instance, the prediction type signal S30 is information, e.g., indicating whether motion prediction is carried out by the frame base or the field base, block matching is carried out by 16×16 pixels, 16×8 pixels or 8×8 pixels, motion prediction is DUAL-PRIME or not. It is to be noted that since the details of 8×8 pixel block prediction and DUAL-PRIME are described in the previously described material ISO-IEC/JTC1/SC29/WG11 MPEG93/225b Test Model 4, their explanation is omitted here.

Further, the field motion vector reference parity signal S31 is a signal indicating whether a field making reference to vector is the first field (field 1) or the second field (field 2) in the case where motion prediction is carried out by field base.

The sub-motion vector signal S32 is, e.g., a vector. attached signal of DUAL-PRIME and 8×8 pixel block prediction.

The predicted field parity signal S33 is a signal indicating whether field of destination of prediction (predicted field) of motion vector is the first field or the second field in the case where motion prediction is carried out by field base.

The motion compensating circuit 18 instructs output of block picture signal S3 positioned at an address designated by motion vector signal S7, prediction type signal S30, field motion vector reference parity signal S31, sub-motion vector signal S32, and predicted field parity signal S33, from field memory group 17 in which pictures already decoded and reproduced (which will be described later) are stored. Reference picture at this time is designated from field memory group 17 in accordance with motion compensation reference picture indication signal S12 outputted from reference picture control element 24.

An output of block picture signal S3 from the motion compensating circuit 18 is caused to be adaptive operation, thus making it possible to carry out switching to an optimum one of selectable motion compensating modes of four kinds of operations described below in unit of macroblocks.

Namely, four kinds of operations are four kinds of modes:
first, motion compensation mode from past reproduced picture (forward predictive mode),
secondly, motion compensation mode from future reproduced picture (backward predictive mode),
thirdly, motion compensation mode from both past and future reproduced pictures (reference block from past reproduced picture and reference block from future reproduced picture are caused to undergo linear operation (e.g., mean value calculation) every pixel) (bidirectionally predictive mode).

Fourthly, mode of no motion compensation (i.e., intra-coded mode. In this case, output of block picture signal S3 is equal to zero). Among these modes, switching to optimum one is carried out from any selectable mode.

In switching of the motion compensation mode, e.g., a mode in which sum total of absolute values of difference values every pixel between respective picture signals S3 outputted in the four kinds of modes and block pixel signal S1 to be currently coded is minimum is selected.

The mode thus selected is sent to respective components through terminal 3 as motion compensation mode signal S9, motion vector signal S8 at that time, prediction type signal S40, field motion vector reference parity signal S41, sub-motion vector signal S42, and predicted field parity signal S43.

Further, macroblock pixel signal S1 to be currently coded is outputted from the field memory group 11, and MB start flag S300 is outputted in synchronism with output of this macroblock pixel signal S1. MB counter 49 counts its number in synchronism with the MB start flag S300. Moreover, MB counter 49 is reset when the picture start flag S22 delivered through terminal 48 is set. It is to be noted that picture coding control signal S25 is also delivered through terminal 46 to the MB counter 49.

Slice start flag S301 outputted through terminal 45 from the MB counter 49 is set when MB count value becomes equal to a multiple of a predetermined slice length (the number of macroblocks which compose slice). Here, slice is a unit comprised of a single or plural macroblocks successive in order of scan of pictures. Consideration is made such that the first macroblock transmits data indicating position within picture at the leading portion of slice so that received data can be restored to normal state even in the case where any error takes place on the receiving side. The slice length is caused to be changeable in dependency upon error state of transmission path of bit stream. In general, according as error probability of transmission path becomes higher, the slice length becomes short. Slice length designated at this time is stored in the memory 29.

The macroblock pixel signal S1 and block pixel signal S3 delivered from motion compensating circuit 18 are caused to undergo calculation of difference value every pixel at a subtracter 13. As a result, a block difference signal S2 is obtained. The block difference signal S2 is delivered to a block signal coding section 14, from which a coded signal S4 is obtained. The coded signal S4 is delivered to a block signal decoding section 15, at which it is decoded. Thus, a block reproduction difference signal S5 is obtained.

In this embodiment, the picture coding control signal S25 caused to be through terminal 7 and quantization table signal S15 caused to be through terminals 31 and 8 are also delivered to the block signal coding section 14. As the configuration of the block signal coding section 14, there may be applied the configuration composed of a DCT (Discrete Cosine Transform) element and a quantizer for quantizing output coefficients by the quantization table signal S15 designated from buffer memory 21. In this case, the picture coding control signal S25 and quantization table signal S15 are delivered also to the block signal decoding section 15. As the configuration of the block signal decoding section 15, there may be applied the configuration composed of an inverse quantizer for inverse-quantizing coefficients by the quantization table signal S15, and an inverse DCT element for implementing inverse- DCT to output coefficients therefrom.

The block reproduction difference signal S5 is added to block picture signal S3 outputted from motion compensating circuit 18 every pixel at adder 16. As a result, a block reproduction signal S6 is obtained. This block reproduction signal S6 is stored into field memory designated by current picture indication signal S13 from field memory group 17. Reproduction picture stored in the field memory group 17 is outputted from terminal 129 as a designated reproduction picture signal in accordance with the previously described output picture indication signal S14.

On the other hand, block coded signal S4 is sent also to an one-dimensional signal generating section 19 supplied with the picture coding control signal S25 through terminal 6, at which it is stored in one-dimensional array. Thus, one-dimensional coded signal S16 is obtained. The configuration of one-dimensional signal generating section 19 is comprised of a scan converter for zigzag scanning block quantization DCT coefficients in order from low frequency to high frequency. One-dimensional coded signal S16 is caused to be a variable length code such as Huffman code at VLC (Variable Length Coder) 20.

Further, motion vector signal S8 is sent to vector difference determination element (labeled difference element in the figure) 27, at which a difference between the motion vector S8 and motion vector S8 subsequently delivered is obtained so that there results difference motion vector signal S50. This difference motion vector signal S50 is caused to be a variable length code such as Huffman code, etc. at VLC element 20. In this embodiment, MB start flag S300, slice start flag S301, motion compensation mode signal S9, picture structure signal S26, and prediction type signal S40 are also delivered to terminal 4.

Figure 2:
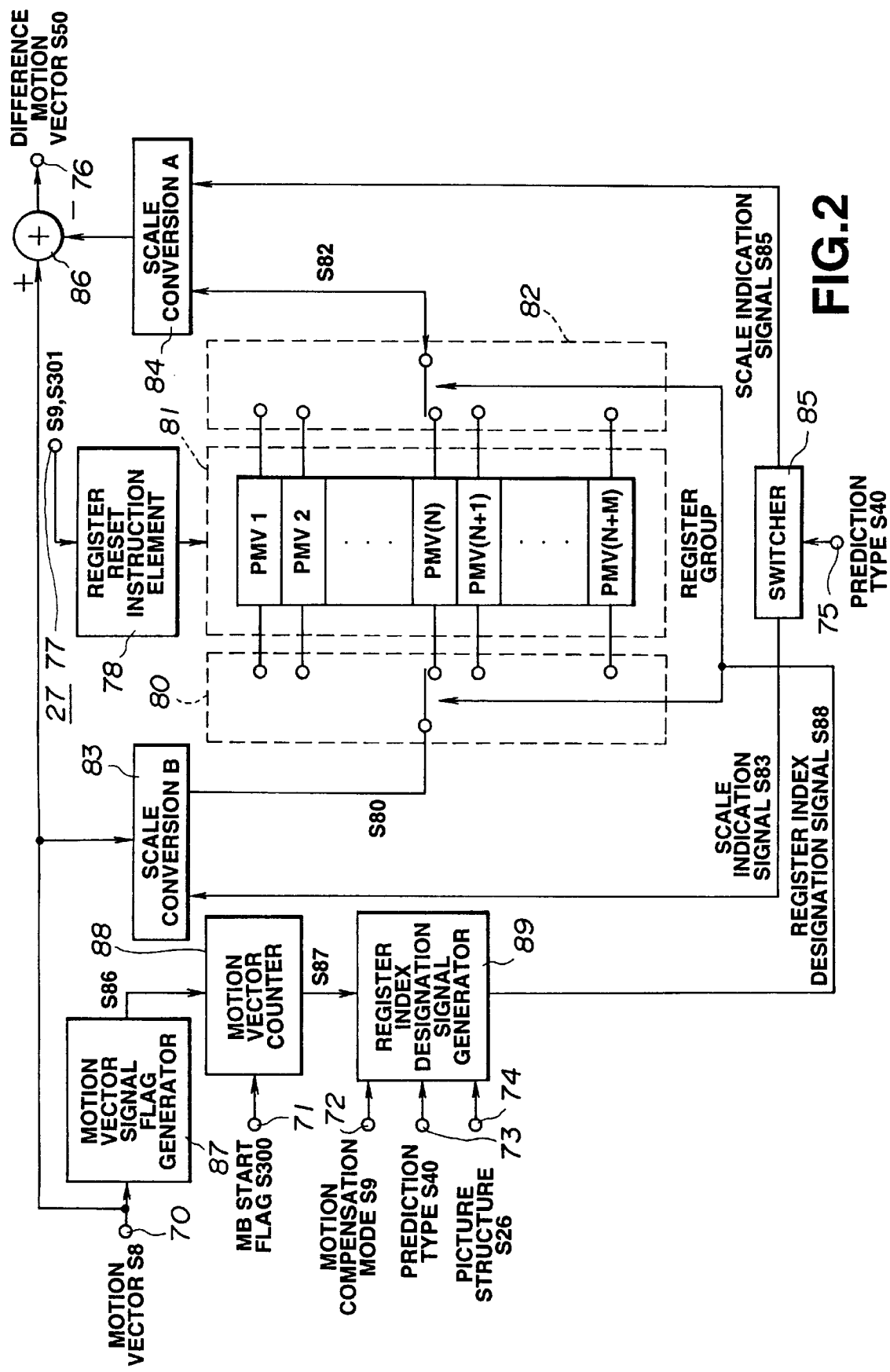
FIG. 2 is a circuit diagram showing, in a block form, outline of difference determination element for motion vector used in the picture signal coding apparatus of this invention.

The detail of the vector difference determination element 27 will be described with reference to FIG. 2. In FIG. 2, slice start flag S301 is inputted to terminal 77 of vector difference determination element 27, MB start flag S300 caused to be through terminals 47 and 4 of FIG. 1 is inputted to terminal 71, motion vector signal S8 caused to be through terminals 3 and 4 of FIG. 1 is inputted to terminal 70, motion compensation mode signal S9 caused to be through terminals 3 and 4 of FIG. 1 is inputted to terminal 72, prediction type signal S40 caused to be through terminals 3 and 4 of FIG. 1 is inputted to terminal 73, and the picture structure signal S26 caused to be through terminal 4 of FIG. 1 is inputted to terminal 74.

In this case, the number of transmission of forward motion vectors or backward motion vectors to be transmitted within macroblock is recognized by the picture structure signal S26 and prediction type signal S40. They are determined as indicated by the Tables 1, 2 and 3 shown below. In this embodiment, respective maximum numbers of transmission of forward motion vectors and backward motion vectors to be transmitted are 2. Accordingly, four motion vectors are transmitted at the maximum within macroblock. It is to be noted that in the case where the number of transmission of forward or backward motion vectors to be transmitted within macroblock is 2, the order of transmission of these two motion vectors is determined in advance. For example, in the case of Field based prediction of Table 1, motion vector in which predicted field is the first field is transmitted earlier, and motion vector in which predicted field is the second field is transmitted later. Further, in the case of 16×8 Field based prediction of Table 2, motion vector of the upper portion is transmitted earlier and motion vector of the lower portion is transmitted later. In addition, motion compensating circuit 18 in this embodiment outputs motion vector S8 in the same order as this transmission order.

TABLE 1 case where picture structure is frame (interlaced) picture

| prediction_type | motion vector count | mv format |
|---|---|---|
| Field based prediction | 2 | field |
| frame based prediction | 1 | frame |
| Dual-prime | 1 | field |

TABLE 2 case where picture structure is field picture

| prediction_type | motion vector count | mv format |
|---|---|---|
| 16 × 16 Field based prediction | 1 | field |
| 16 × 8 Field based prediction | 2 | field |
| Dual-prime | 1 | field |

TABLE 3 case where picture structure is progressive picture

| prediction_type | motion vector count | mv format |
|---|---|---|
| 16 × 16 Field based prediction | 1 | frame |
| 16 × 8 Field based prediction | 2 | frame |
| 8 × 8 Field based prediction | 1 | frame |

Figure 3:
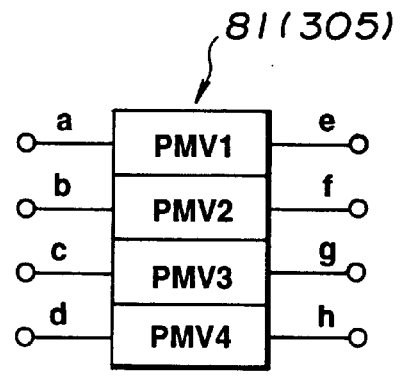
FIG. 3 is a view showing register memory for explaining difference determination element and inverse determination difference element for motion vector used in the picture signal coding apparatus of this invention.

In this embodiment, register group 81 in vector difference determination element 27 of FIG. 2 is constructed as shown in FIG. 3, for example. In FIG. 3, four register memories PMV1~PMV4 for storing motion vectors are prepared as register group 81.

Moreover, forward motion vectors and backward motion vectors are caused to respectively have one-to-one correspondence relationship with respect to register memories PMV1~PMV4 in accordance with order of transmission within macroblock. In more practical sense, forward motion vector transmitted first within macroblock is stored into register memory PMV1. Forward motion vector transmitted secondly within macroblock is stored into register memory PMV2. Further, backward motion vector transmitted first within macroblock is stored into register memory PMV3. Backward motion vector transmitted secondly within macroblock is stored into register memory PMV4. As stated above, in this embodiment, the order of transmission within macroblock of respective motion vectors provides indices indicating the relationship between respective motion vectors and registers within register memories PMV1~PMV4 into which those motion vectors are stored.

In other words, in this embodiment, indices of "1"~"2" are provided in order of transmission of forward motion vectors within macroblock, and indices of "3"~"4" are provided in order of transmission of backward motion vectors therewithin, thus allowing motion vectors having respective indices and the register memories PMV1~PMV4 to have one-to-one correspondence relationship. It is to be noted that respective input terminals a~d of register memories PMV1~PMV4 of FIG. 3 are connected to corresponding selected terminals of switch 80 to FIG. 2, and output terminals e~h are connected to corresponding selected terminals of switch 82 of FIG. 2.

Syntax of bit stream at the time of transmission of motion vector is shown in Table 4.

Here, "forward_motion_vector ( )" will now be described below. Initially, in the case where there is one "motion_vector_count" (017 line), information of motion vector is stored into register memory PMV1. Moreover, in the case where there are two "motion_vector_count", information of motion vector transmitted first (028 line) is stored into register memory PMV1, and information of

TABLE 4

```
001    motion_vector( ) {/*bit stream·syntax of motion vector*/
002    motion_horizontal_code;/* horizontal component X of motion vector */
003    motion_vertical_code;/* vertical component Y of motion vector */
004    }
005
006    forward_filed_motion_vector( ) {
007    motion_vertical_field_select;/*field motion vector reference·parity*/
008    motion_vector( );
009    }
010
011    backward_field motion_vector( ) {
012    motion_vertical_field_select;/*field motion vector reference·parity*/
013    motion_vector( );
014    }
015
016    forward_motion_vector( ) {/*bit stream·syntax with respect to forward vector */
017    if(motion_vector_count==1) {/*when No. of motion vectors is 1*/
018    if(mv_format==frame) {/*case where mv_format is frame*/
019    motion_vector( ) ;/*Index_1(→PMV1), PMV2=PMV1*/
020    } else {/*case where mv_format is field*/
021    forward_field_motion_vector( );/*Index_1(→PMV1), PMV2=PMV1*/
022    if(dmv==1) {*/case of Dual_prime*/
023    dmv_horizontal;*sub motion vector*/
024    dmv_vertical;/*sub motion vector*/
025        }
026      }
027    } else {/*motion_vector_count==2; when No. of motion vectors is 2*/
028    forward_field_motion_vector( );/*Index_1(→PMV1)*/
029    forward_field_motion_vector( );/*Index_2(→PMV2)*/
030      }
031    }
032
033    backward_motion_vector( ) {/*bit stream·syntax with respect to backward vector*/
034    if(motion_vector_count==1 {/*when No. of motion vectors is 1*/
035    if(mv_format==frame) {/*case where mv_format is frame*/
036    motion_vector( );/*Index_3(→PMV3), PMV4=PMV3*/
037    } else {/*case where mv_format is field */
038    backward_field_motion_vector( );*Index_3(→PMV3), PMV4=PMV3*/
039    if(dmv==1) {*/case of Dual_prime*/
040    dmv_horizontal;/*sub motion vector*/
041    dmv_vertical;/*sub motion vector*/
042        }
043      }
044    } else {/*motion_vector_count==2; when No. of motion vectors is 2*/
045    backward_field_motion_vector( );/*Index_3(→PMV3)*/
046    backward_field_motion_vector( );/*Index_4(→PMV4)*/
047      }
048    }
```

In this Table 4, function "forward_motion_vector ( )" functions in connection with forward motion vector, and function "backward_motion_vector( )" is function in connection with backward motion vector. Moreover, the statement encompassed by "/*" and "*/" is comment. As shown in this Table, motion vectors to be transmitted and register memories PMV are caused to respectively correspond to each other. In this case, parameters of "mv_format", "motion_vector_count" are used, and these parameters are given on the basis of Tables 1~3. As "mv_format", as shown in Table 1, 2, there are "frame" type and "field" type. Field motion vector reference parity is basically added to vector of "field" type. Further, "motion_vector_count" indicates the number of transmission of forward or backward vectors to be transmitted within one macroblock as shown in the Tables 1~3.

motion vector transmitted secondly (029 line) is stored into register memory PMV2. In more detail, in the case where there is one information of motion vector to be transmitted (017 line), decision path is branched into two cases of the case where "mv_format" is "frame" (018 line) and the case where "mv_format" is "field" (020 line). Under the case where "mv_format" is "field", further in the case where "dmv==1" (022 line), "prediction_type" is "Dual_prime". Accordingly, "dmv_horizontal" and "dmv_vertical" are transmitted. They are sub-motion vector when prediction type is "Dual_prime". This similarly applies to "backward_motion_vector ( )".

In macroblock in which there is one forward motion vector to be transmitted, in updating register memory PMV1 register memory PMV2 is updated by the same value. Further, in macroblock in which there is one backward motion vector to be transmitted, in updating register memory PMV3, register memory PMV4 is updated by the same value.

The operation of bit stream syntax which has been explained in the above-mentioned Table 4 will now be described by using the configuration of FIG. 2.

In FIG. 2, in response to the motion vector signal S8 inputted through terminal 70, motion vector signal flag generator 87 outputs motion vector signal flag S86. Such motion vector signal flags S86 are counted by motion vector counter 88. It is to be noted that motion vector counter 88 is reset when the MB start flag S300 caused to be through terminal 71 is set. Motion vector counter number signal S87 from the motion vector counter 88 is inputted to register index designation signal generator 89. The motion compensation mode signal S9, prediction type signal S40 and picture structure signal S26 which are caused to be through terminals 72, 73, 74 are inputted to the register index designation signal generator 89.

In the case of this embodiment, the number of transmission of forward motion vectors or backward motion vectors to be transmitted (motion_vector_count) within macroblock is recognized by the picture structure signal S26 and prediction type signal S40, and the number of all motion vectors to be transmitted within macroblock is recognized by motion compensation mode signal S9. For example, in the case where "motion_vector_count" is 2 and motion compensation mode signal S9 is bidirectionally predictive mode, since motion vectors to be transmitted within macroblock are transmitted in order of two forward motion vectors and two backward motion vectors, the number of all motion vectors transmitted within macroblock is 4.

On the basis of this information, register index designation signal generator S89 generates register index designation signal S88 from motion vector count number signal S87 to output it. For example, in the example of FIG. 3 mentioned above, when motion vector count number signal S87 takes the value 1, register memory PMV1 is designated in register group 81; when that signal takes the value 2, register memory PMV2 is designated in register group 81; when that signal takes the value 3, register memory PMV3 is designated in register group 81; and when that signal takes the value 4, register memory PMV4 is designated in register group 81.

As another example, in the case where there is one "motion_vector_count" and motion compensation mode signal S9 is the backward predictive mode, since there is one backward vector as the number of all motion vectors to be transmitted within macroblock, register memory PMV3 is designated in register group 81 when motion vector count number signal S87 takes the value 1.

In response to the register index designation signal S88, the register group 81 outputs motion vector signal S82 stored in the designated register through switch 82.

This register output motion vector signal S82 is scale-converted by scale indication signal S85 (scale indication signal A) outputted from switching circuit 85 on the basis of prediction type signal S40 from terminal 75 at scale converter 84 of scale conversion A as occasion demands, and is then inputted to difference circuit 86. At this circuit, a difference value between the scale converted motion vector and currently inputted motion vector signal S8 is calculated. Thus, difference motion vector signal S50 is obtained. This signal is outputted from terminal 76.

On the other hand, the currently inputted motion vector signal S8 is scale-converted (scale converted motion vector signal S80) by scale indication signal S83 (scale indication signal B) outputted from the switching circuit 85 at scale converter 83 of scale conversion B as occasion demands, and is then overwritten and is newly stored into register designated by the register index designation signal S88 through switch 80. It is to be noted that scale converter 84 and scale converter 83 as mentioned above may be used for spatial scale adjustment at the time of calculating difference motion vector between motion vector making reference to frame and motion vector making reference to field, and/or scale adjustment based on the cause in point of the time base at the time of calculating difference vector between motion vectors in which differences in point of time up to reference field are different.

Reset of register memory PMV of the vector difference determination element 27 is carried out at macroblock in which motion compensation mode signal S9 caused to be through terminal 77 is intra-coded mode and macroblock in which slice start flag S301 from terminal 77 is set. At this time, all registers of register group 81 are reset to zero. Instruction of reset of this register is carried out by register reset instruction element 78.

In this embodiment, difference determination element 27 for motion vector is constructed as above. It is to be noted that while, in the above-described embodiment, the order of output of motion vectors S8 of motion compensating circuit 18 is the same as the order of transmission of motion vectors determined in advance, the former may be different from the latter. However, also in this case, since input order of difference motion vectors S50 to VLC element 20 is required to be finally the same as the transmission order, it is necessary to extra or additional configuration for delivering predicted field parity signal to register index designation signal generator 89 to transpose or interchange output order of difference motion vectors S50, or the like.

The configuration of skipped macroblock judge element 28 of FIG. 1 will now be described with reference to FIG. 4.

Figure 4:
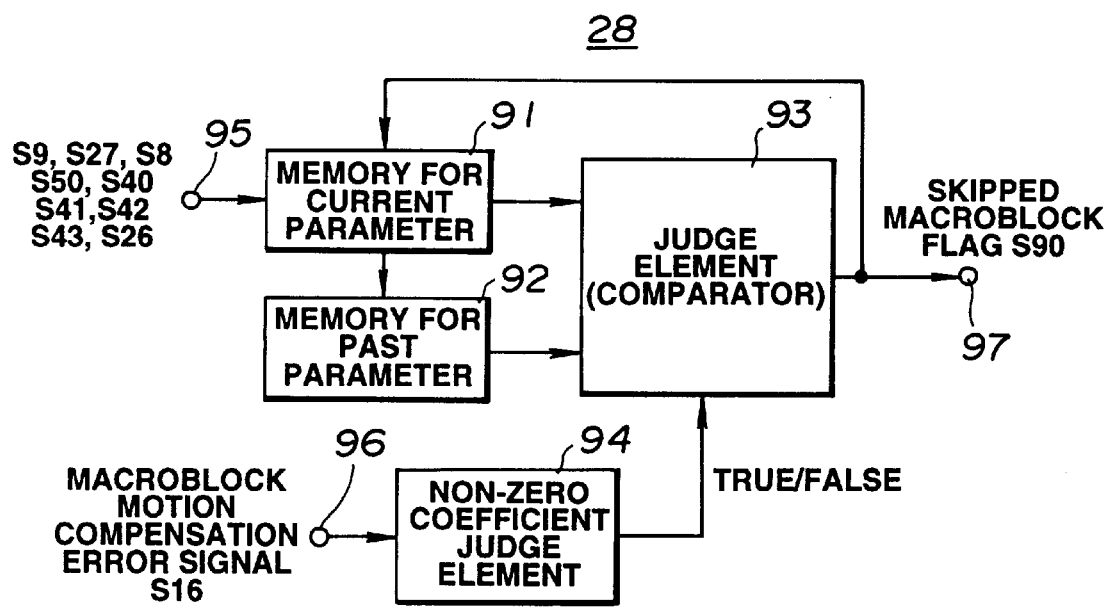
FIG. 4 is a circuit diagram showing, in a block form, a skipped macroblock judge element of the encoder used in the picture signal coding apparatus of this invention.

In FIG. 4, motion compensation predictive error signal S16 is delivered to terminal 96 of skipped macroblock judge element 28. Moreover, the difference motion vector signal S50, motion vector signal S8 from terminal 4 of FIG. 1, motion compensation mode signal S9, picture structure signal S26, prediction type signal S40, field motion vector reference parity signal.S41 from terminal 5 of FIG. 1, sub-motion vector signal S42, predicted field parity signal S43, and picture coding type signal S27 are delivered to the skipped macroblock judge element 28 in addition to the motion compensation predictive error signal S16. Namely, motion vector signal S8, difference motion vector signal S50, motion compensation mode signal S9, prediction type signal S40, field motion vector reference parity signal S41, sub-motion vector signal S42, predicted field parity signal S43, picture coding type signal S27, and picture structure signal S26 are inputted to terminal 95 of FIG. 4. These signals are stored into memory 91 for storage of current macroblock parameters.

Motion compensating predictive error signal S16 of macroblock is caused to undergo judgment, at non-zero coefficient judge element 94, as to whether signal to be transmitted exists. When signal to be transmitted exists, the judge element 94 informs judge element 94 of that fact. Responding to this, the judge element 93 sets macroblock flag S90 to "FALSE" to output it.

On the other hand, in the case where there exists no predictive error signal to be transmitted (i.e., coefficients of S16 are all zero), judge element 94 notifies signal of "TRUE" to judge element 93. In this case, the judge element 93 further carries out comparative judgment of the content of the memory 91 and the content of memory 92 for storage of past macroblock parameters.

Here, at the judge element 93, in the case where picture coding type signal S27 is P picture, there is carried out comparative judgment of the conditions where first, motion vector signal S8 is zero;

secondly, motion compensation mode signal S9 is the forward prediction;

thirdly, field motion vector reference parity signal S41 is the same as parity of predicted field in the case where prediction type signal S40 is the field prediction; and fourthly, sub-motion vector signal S42 is zero.

When these conditions are satisfied, the judge element 93 sets skipped macroblock flag S90 to "TRUE" to output it. When otherwise, skipped macroblock flag S90 is "FALSE". This macroblock flag S90 is outputted through terminal 97, and is sent to the VLC element 20 of FIG. 1.

Further, at the judge element 93, in the case where picture coding type signal S27 is B picture, there is carried out comparative judgment of the conditions where first, difference motion vector signal S50 is zero; and secondly, motion compensation mode signal S9, prediction type signal S40, field motion vector reference parity signal S41, sub-motion vector signal S42, and predicted field parity signal S43 are respectively the same with respect to the contents of memories 91 and 92.

When these conditions are satisfied, the judge element 93 sets skipped macroblock flag S90 to "TRUE" to output it. When otherwise, skipped macroblock flag S90 is "FALSE".

It is to be noted that, at macroblocks of the leading and the last of slice, skipped macroblock is inhibited even in the case where the above-described conditions are satisfied.

In the case where skipped macroblock flag S90 is "FALSE", the content of memory 91 is copied into memory 92. Moreover, with respect to macroblock in which skipped macroblock flag S90 is "TRUE", VLC element 20 does not any data.

The skipped macroblock judge element 28 is constructed as above.

Further, with respect to judgment of skipped macroblock, another embodiment will now be described. In another embodiment, the condition for allowing skipped macroblock of P picture and B picture to hold in the above-described embodiment is further limited as follows. Namely, in the case where picture structure is the frame structure, prediction type is limited to only the case of Frame based prediction. Moreover, in the case where picture structure is field structure, the prediction type is limited to only the case of 16×16 Field based prediction. Namely, prediction type of B picture also becomes irrelevant to the prediction type of the former macroblock.

The summary of the condition for allowing skipped macroblock to hold in this case is as follows. In the case where non-zero judge element 94 judges inputted respective macroblocks to be a macroblock in which no signal to be transmitted exists, judge element 93 further judges whether or not respective macroblocks satisfy this condition required for allowing skipped macroblbck to hold. Initially, in the case where picture coding type signal S27 is P picture and picture structure signal S26 is field structure, the condition for allowing skipped macroblock to hold is: first, motion vector signal S8 is zero;

secondly, motion compensation mode signal S9 is forward prediction;

thirdly, prediction type signal S40 is field prediction of 16×16; and fourthly, field motion vector reference parity signal S41 is equal to parity of predicted field parity signal S43.

Further, in the case where picture coding type signal S27 is P picture, and P picture structure signal S26 is frame structure, the condition for allowing skipped macroblock to hold is: first, motion vector signal S8 is zero;

secondly, motion compensation mode signal S9 is the forward prediction; and thirdly, prediction type signal S40 is the frame prediction.

Further, in the case where picture coding type signal S27 is B picture, and picture structure signal S26 is field structure, the condition for allowing skipped macroblock to hold is: first, difference motion vector signal S50 is zero;

secondly, motion compensation mode signal S9 is the same as that of the former macroblock;

thirdly, prediction type signal S40 is field prediction of 16×16;

fourthly, field motion vector reference parity signal S41 is the same as the former macroblock; and fifthly, predicted field parity signal S43 is the same as the former macroblock.

In addition, in the case where picture coding type signal S27 is B picture, and picture structure signal S26 is frame, the condition for allowing skipped macroblock to hold is: first, difference motion vector signal S50 is zero;

secondly, motion compensation mode signal S9 is the same as the former macroblock; and thirdly, prediction type signal S40 is the frame prediction.

Turning back to FIG. 1, after an output from VLC element 20 is stored into buffer memory 21, bit stream is sent at a fixed transmission rate from output terminal 22.

The moving picture coding apparatus is constructed in a manner stated above to carry out coding of moving picture, output of bit stream, and output of coded picture.

A moving picture decoding apparatus (decoder) having an inverse difference determination element for motion vector will now be described with reference to FIG. 5.

Figure 5:
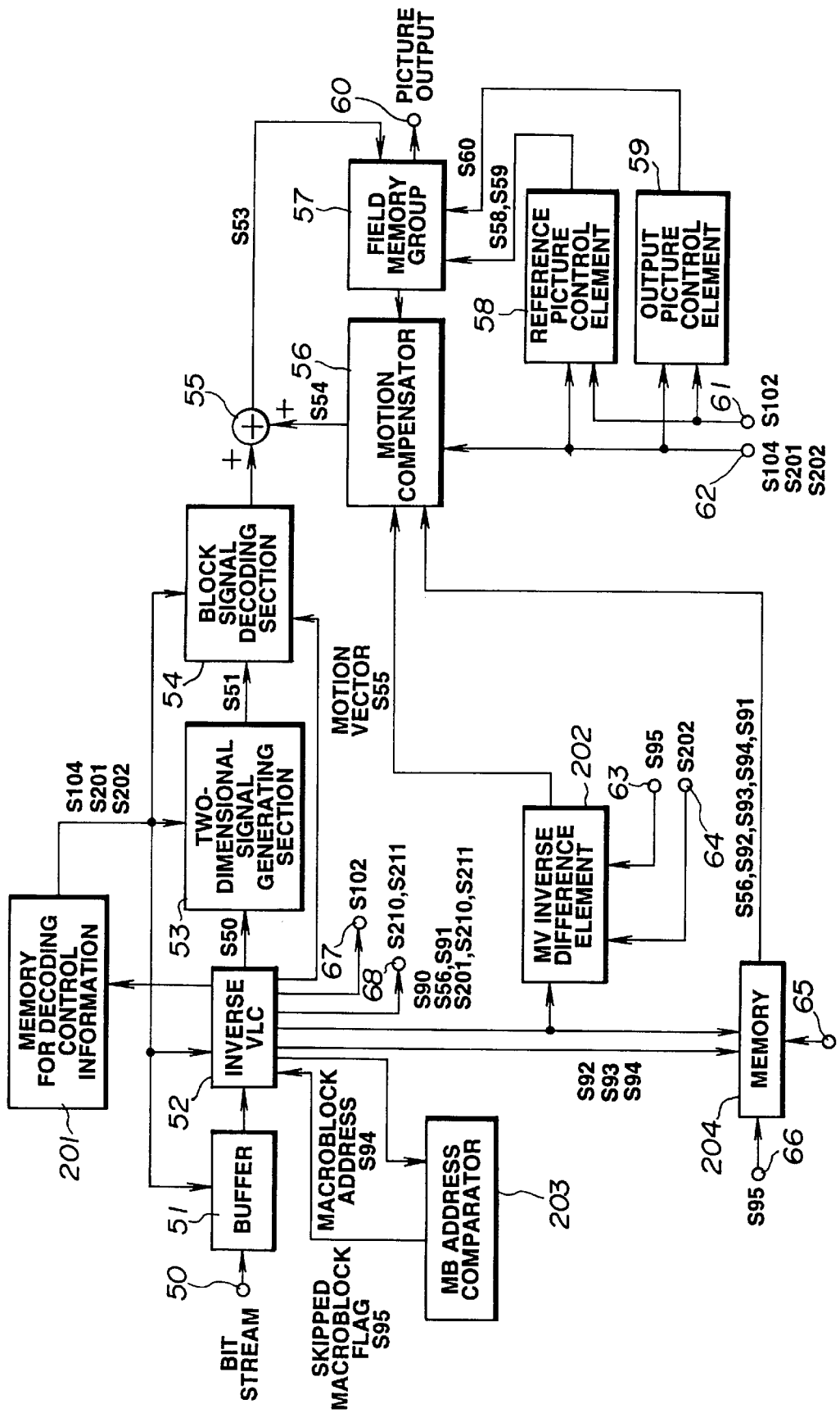
FIG. 5 is a circuit diagram showing, in a block form, a decoder used in a picture signal decoding apparatus of this invention.

In FIG. 5, bit stream signal inputted from input terminal 50 is stored into buffer memory 51, and is then delivered to inverse VLC element 52.

When inverse VLC element 52 detects the leading portion of picture to be decoded, it sets picture start flag S102 to deliver it to reference picture control element 58. In this embodiment, this picture start flag S102 is sent to the reference picture control element 58 through terminals 67 and 61. When the picture start flag S102 is set, the reference picture control element 58 outputs reference picture indication signals which will be described later to deliver them to field memory group 57.

Moreover, when inverse VLC element 52 detects the leading portion of slice to be decoded, it sets slice start flag S211.

Similarly, the picture start flag S102 is delivered also to output picture control element 59. When the picture start flag S102 is set, output picture control element 59 outputs output picture indication signal S60 which will be described later to deliver it to field memory group 57.

Control information for controlling the moving picture decoding apparatus of this invention obtained from inverse VLC element 52 is stored into memory 201. This control information is outputted as control signal S104. Further, picture structure signal S201 and picture coding type signal S202 are outputted from memory 201. They are delivered to the inverse VLC element 52.

Coded macroblock signal S50 which has been taken out from inverse VLC element 52 is delivered to two-dimensional signal generating section 53. In addition, MB start flag S210 is outputted in synchronism with an output of coded macroblock signal S50 from the inverse VLC element 52.

The coded macroblock signal S50 is caused to be two-dimensional block signal S51 at the two-dimensional signal generating section 53. This two-dimensional block signal S51 is delivered to block signal decoding section 54, at which it is decoded. Thus, block reproduction difference signal S52 is obtained.

As the configuration of the block signal decoding section 54, the configuration composed of inverse quantizer for inverse-quantizing coefficients by quantization table signal S57 taken out from inverse VLC element 52 and inverse DCT element for implementing inverse DCT (Discrete Cosine Transform) to output coefficients therefrom may be applied.

Further, as the configuration of two-dimensional signal generating section 53, the configuration comprised of inverse scan converter for inverse-zigzag scanning the coded block signal S50 in order of coefficients from low frequency to high frequency may be applied.

On the other hand, difference motion vector signal S90 attached to macroblock to be currently decoded which has been taken out from inverse VLC element 52 is reconstructed at inverse difference determination element (labeled MV inverse difference element in the figure) 202. Reconstructed motion vector signal S55 from the inverse difference determination element 202, and motion compensation mode signal S56, prediction type signal S91, field motion vector reference parity signal S92, sub-motion vector signal S93 and predicted field parity signal S94 are sent to motion compensator 56 which are outputted from the inverse VLC element 52 and caused to be through memory 204. Responding to these signals, this motion compensator 56 instructs output of block picture signal from field memory group 57 in which pictures already decoded and reproduced are stored.

In more practical sense, the motion compensator 56 recognizes reproduction picture designated from field memory group 57 by the previously described reference picture indication signal S58 as reference picture to instruct output of block picture signal positioned at an address within reference picture designated by motion compensation mode signal S56, motion vector signal S55, prediction type signal S91, field motion vector reference parity signal S92, sub-motion vector signal S93, and predicted field parity signal S94.

The motion compensator 56 is adapted to perform an adaptive operation corresponding to motion compensation mode signal S56, i.e., to perform four kinds of operations described below in units of macroblocks. It is to be noted that the size of block is, e.g., 16×16 pixels, 16×8 pixels or 8×8 pixels.

Namely, as modes of four kinds of operations in this case, there are first, motion compensation mode from past reproduction picture, secondly, motion compensation mode from future reproduction picture, thirdly, motion compensation mode from both past and future reproduction pictures (implement linear operation (e.g., mean value calculation) every pixel to reference block from past reproduction picture and reference block from future reproduction picture), and fourthly, mode of no motion compensation (i.e., intracoded mode. In this case, output of block picture signal S54 is equal to zero). The motion compensator 56 selects one of four kinds of operation modes in accordance with motion compensation mode signal S56.

Block reproduction difference signal S52 from the block signal decoding section 54 is added to block picture signal S54 outputted from the motion compensator 56 every pixel at adder 55. As a result, block reproduction signal S53 is obtained. This block reproduction signal S53 is stored into a field memory designated by current picture indication signal S59 from field memory group 57.

Moving picture is reconstructed from bit stream in a manner stated above.

Reproduction picture designated in accordance with the previously described output picture indication signal S60 of reproduction pictures stored in the field memory group 57 is outputted from terminal 60.

It is to be noted that control signal S104, picture structure signal S201, and picture coding type signal S202 are delivered through terminal 62 to the motion compensator 56, reference picture control element 58, and output picture control element 59.

The previously described inverse difference determination element 202 for motion vector will now be described with reference to FIG. 6.

Figure 6:
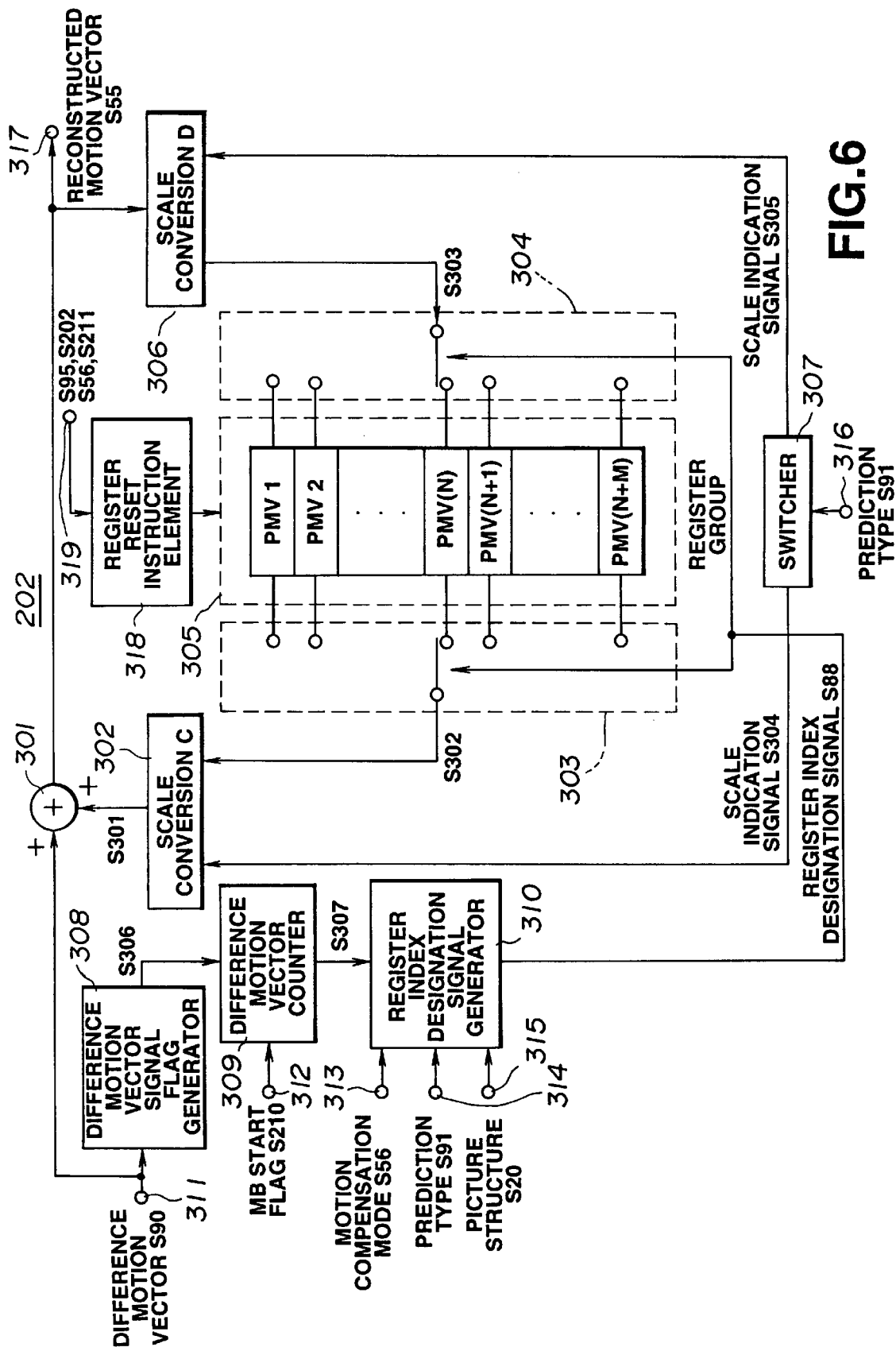
FIG. 6 is a circuit diagram showing, in a block form, outline of the configuration of inverse difference determination element for motion vector used in the picture signal decoding apparatus of this invention.
Figure 9:
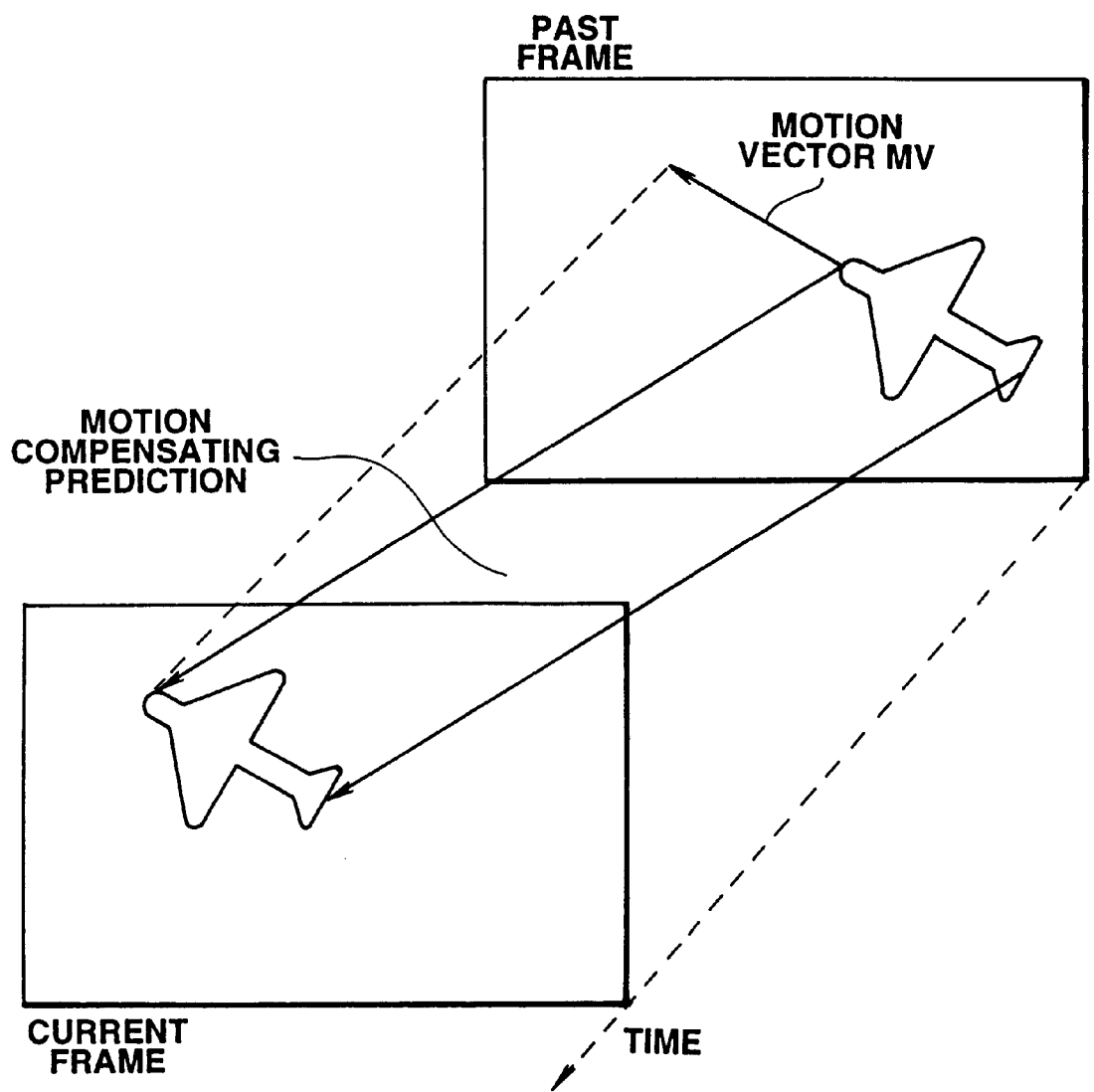
FIG. 9 is a view for explaining the principle of motion compensating prediction.
Figure 10:
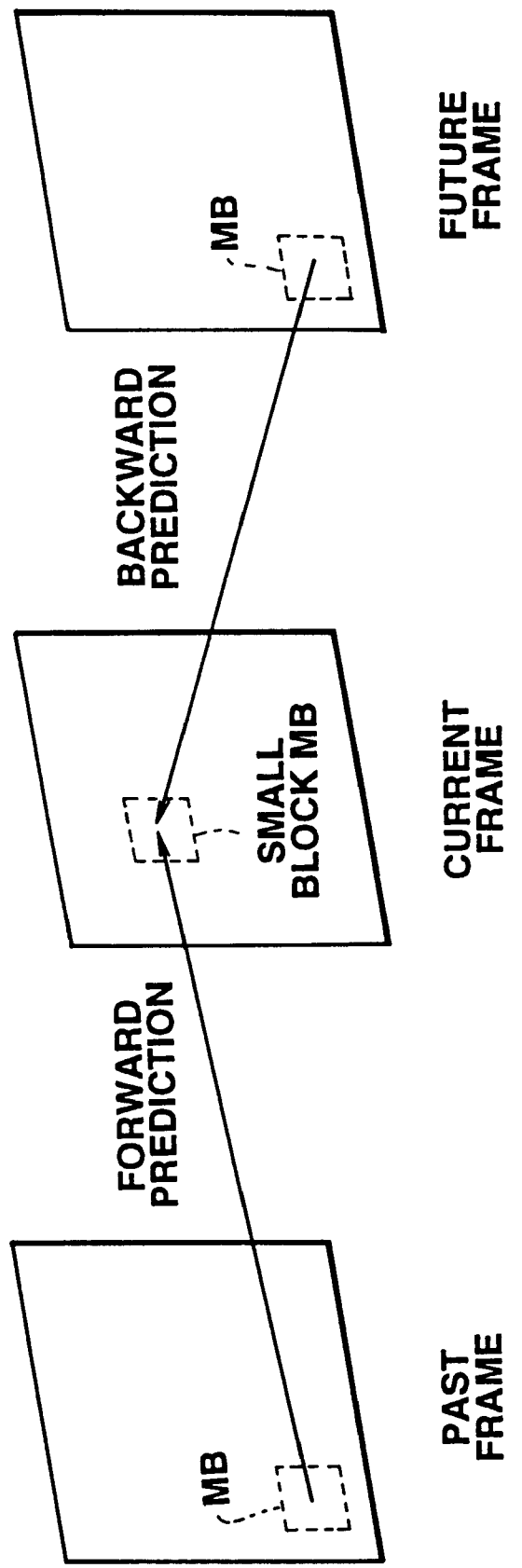
FIG. 10 is a view for explaining motion compensating prediction in units of macroblocks.
Figure 11:
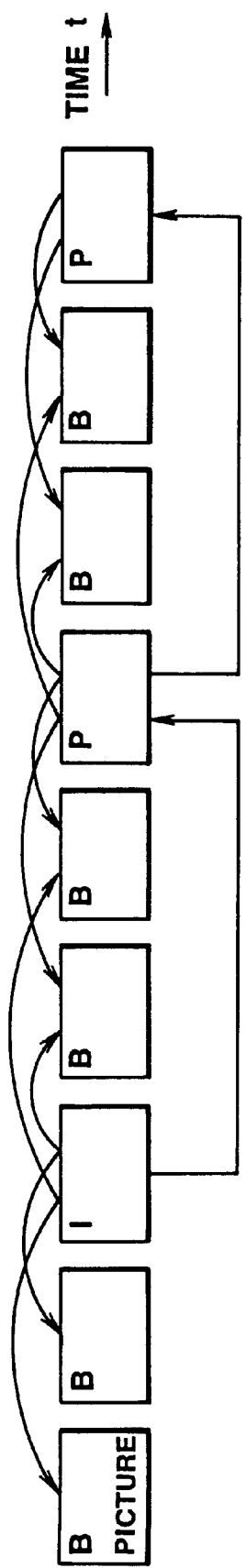
FIG. 11 is a view for explaining motion compensating prediction between pictures.
Figure 12:
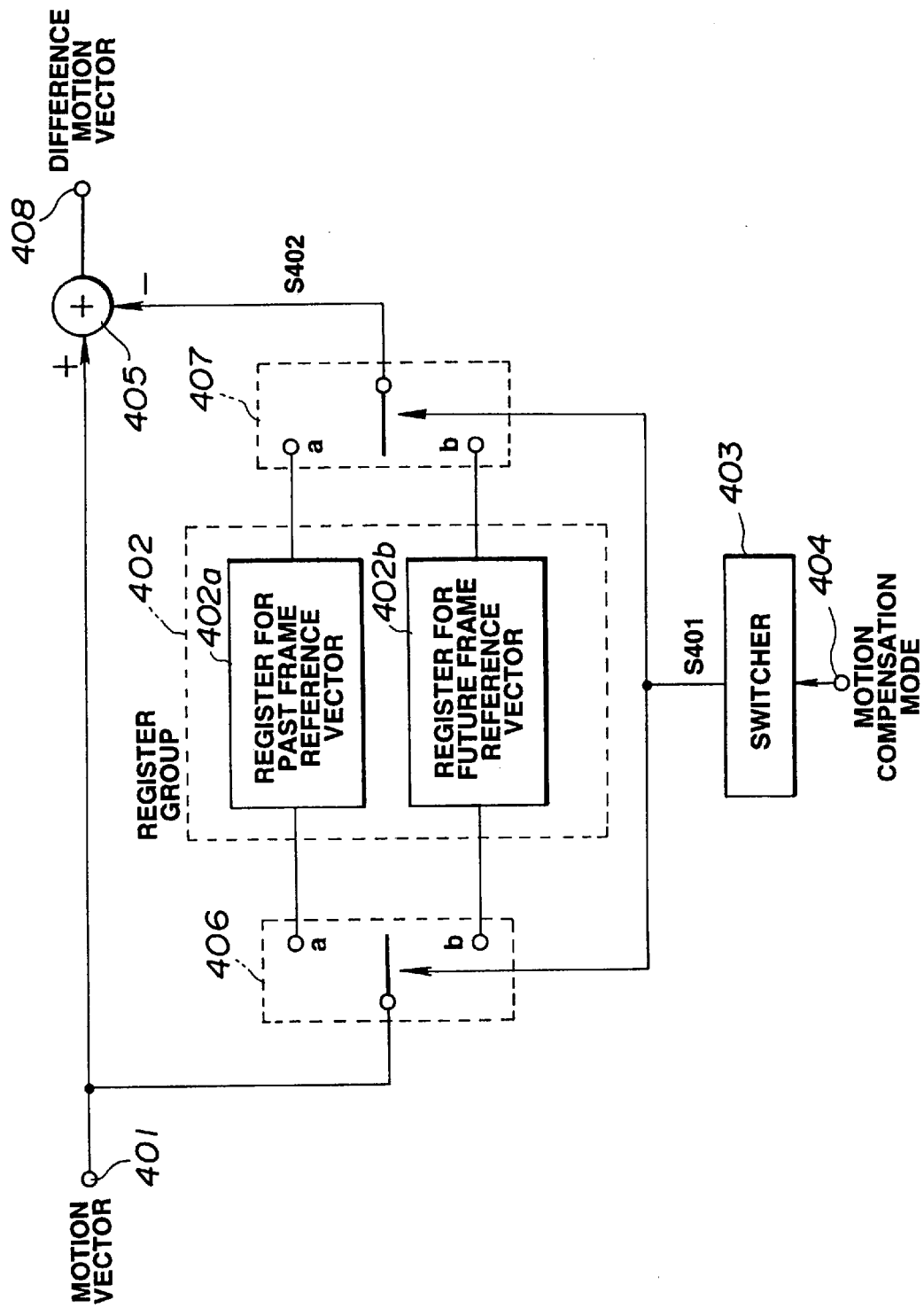
FIG. 12 is a circuit diagram showing, in a block form, difference determination element for motion vector at MPEG1.
Figure 13:
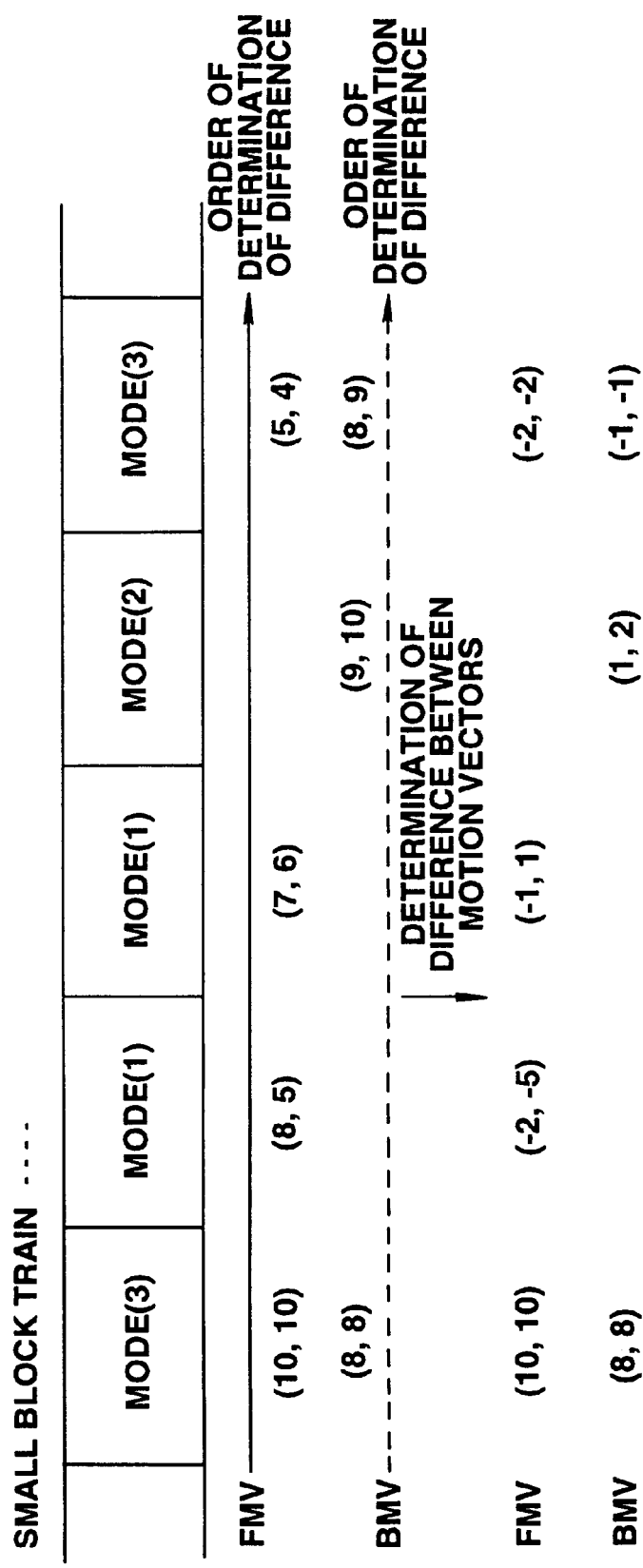
FIG. 13 is a view for explaining an example of operation of difference determination element for motion vector at MPEG1.
Figure 14:
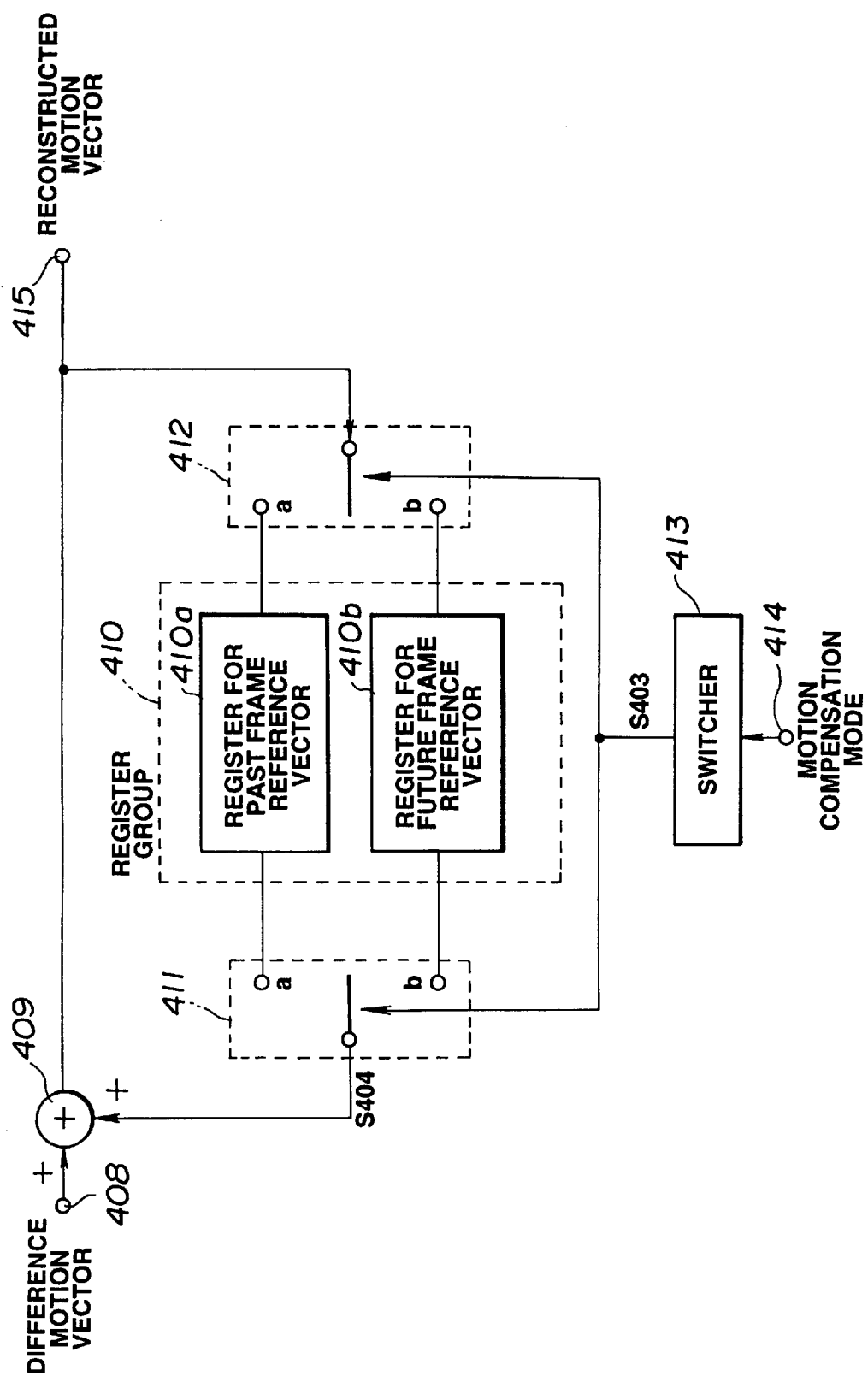
FIG. 14 is a circuit diagram showing, in a block form, outline of the configuration of inverse difference determination element for motion vector at MPEG1.
Figure 15:
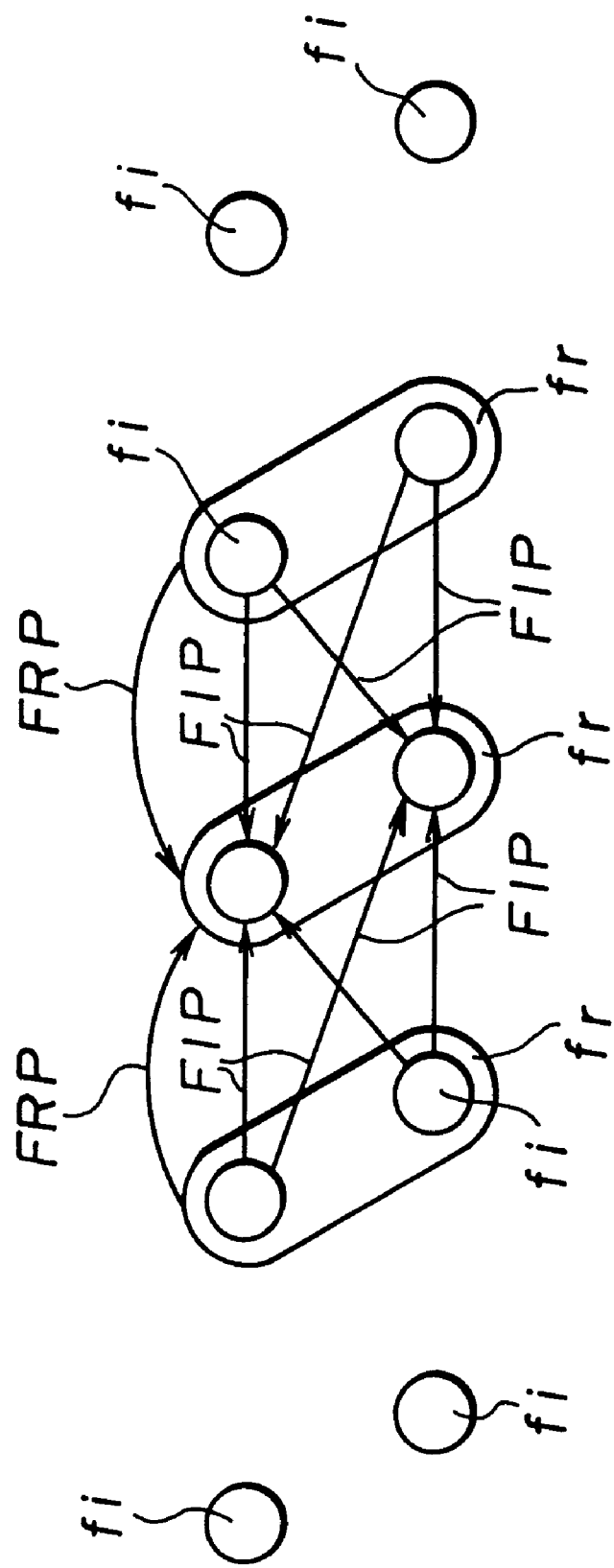
FIG. 15 is a view for explaining frame/field adaptive prediction.
Figure 16:
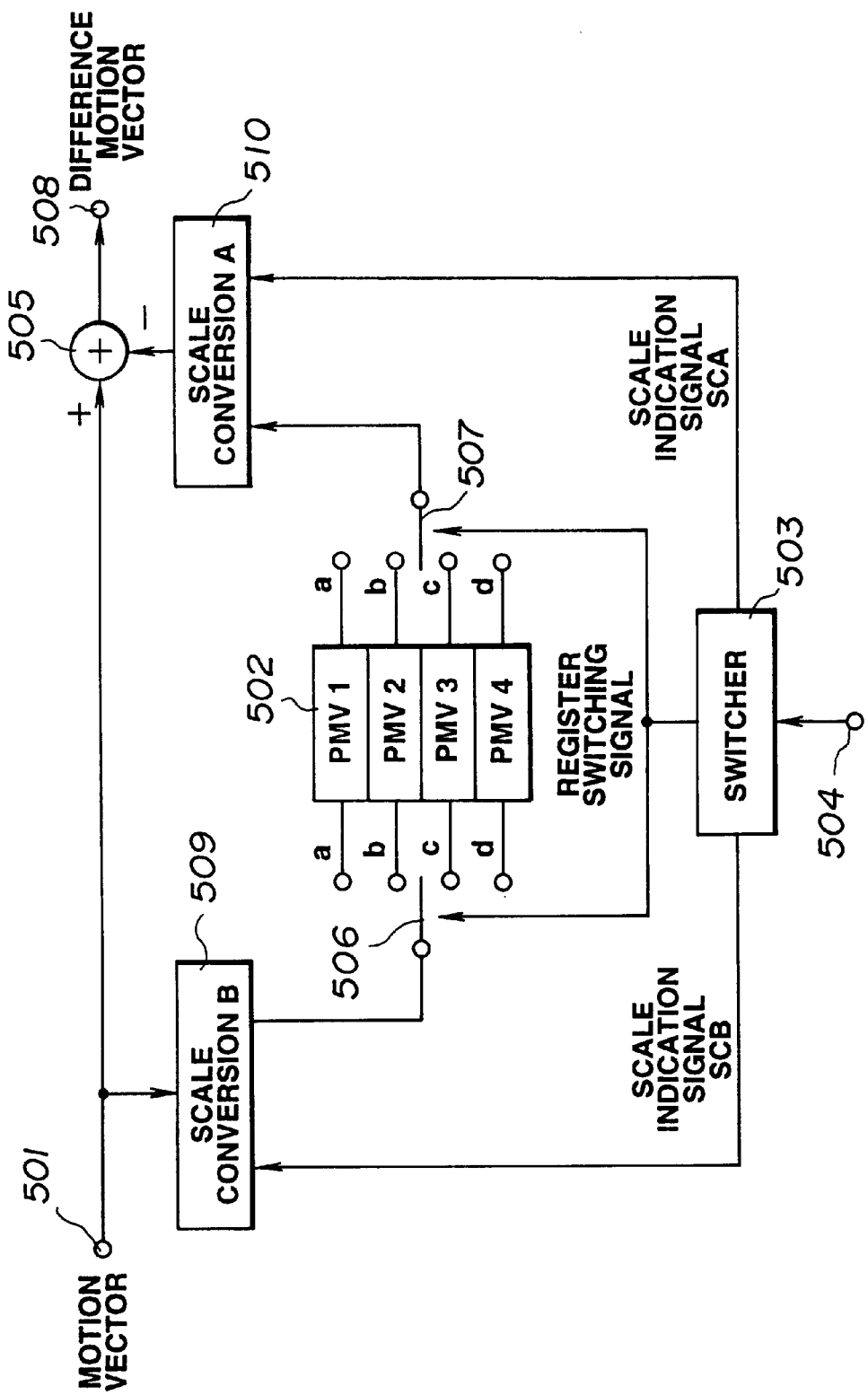
FIG. 16 is a circuit diagram showing, in a block form, a conventional example of difference determination element for motion vector.
Figure 17:
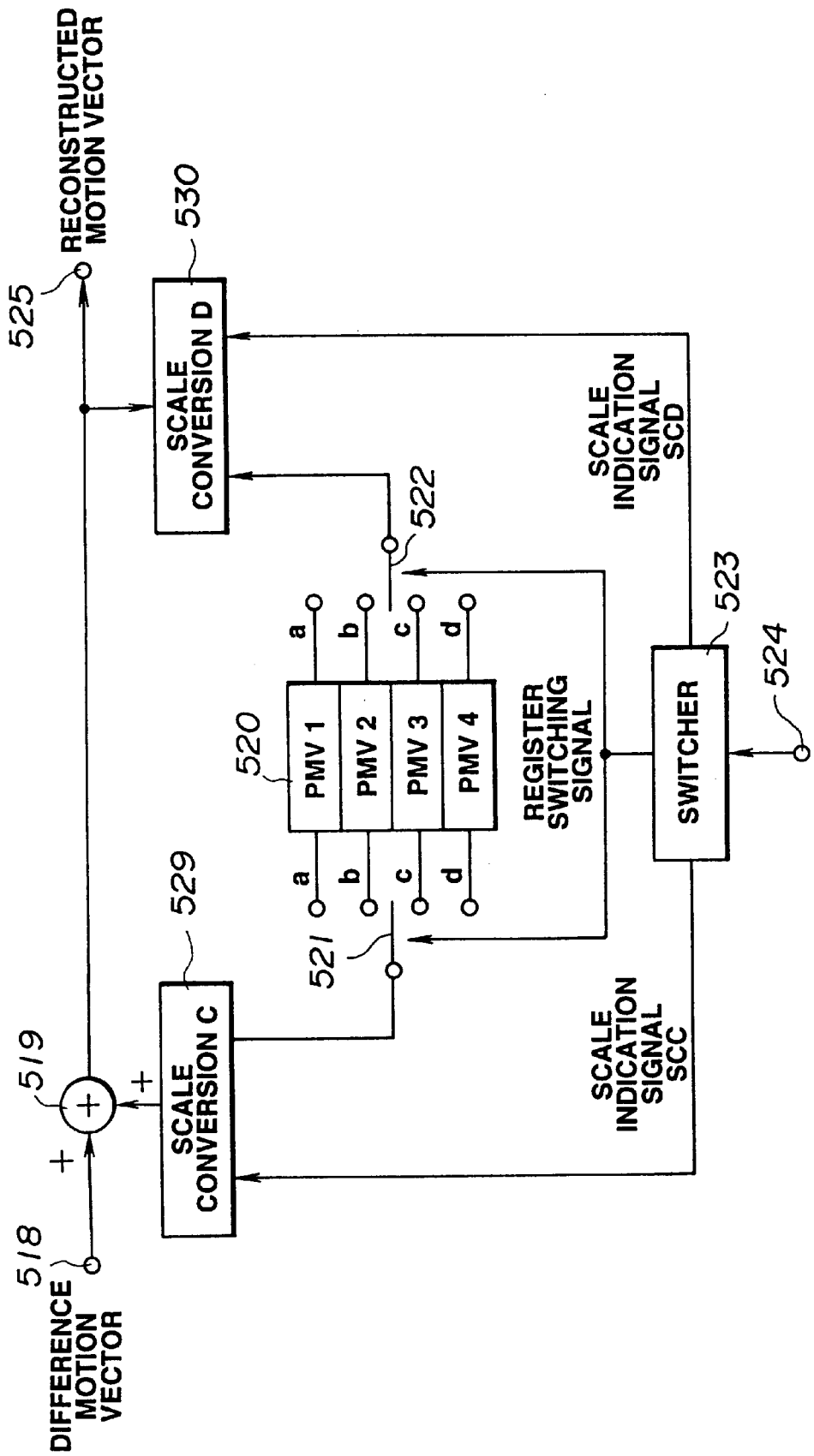
FIG. 17 is a circuit diagram showing, in a block form, a conventional example of inverse difference determination element for motion vector.

In FIG. 6, the difference motion vector signal S90 delivered through terminal 311 is reconstructed at inverse difference determination element 202 of FIG. 6. To the vector inverse difference determination element 202, slice start flag S211, MB start flag S210, difference motion vector signal S90, motion compensation mode signal S56, prediction type signal S91, and picture structure signal S201 are inputted. Namely, the MB start flag S210 is delivered to terminal 312, motion compensation mode signal S56 is delivered to terminal 313, prediction type signal S91 is delivered to terminals 314 and 316, and picture structure signal S201 is delivered to terminal 315.

In this case, the number of reception of forward difference motion vectors or backward difference motion vectors to be received within macroblock is recognized by the picture structure signal S201 and prediction type signal S91. Such number of reception is determined as indicated by the above-mentioned Tables 1~3. In this embodiment, respective maximum numbers of receptions of forward difference motion vectors and backward difference motion vectors are 2. Accordingly, four difference motion vectors are received at the maximum within macroblock.

For this reason, in this embodiment, register group 305 in vector inverse difference determination element 202 of FIG. 6 is constructed as shown in FIG. 3 mentioned above. In this case, four register memories PMV1~PMV4 for storing motion vectors are prepared in a manner similar to the above.

Forward difference motion vectors and backward difference motion vectors are caused to respectively have one-to-one correspondence relationship with respect to register memories PMV1~PMV4 in accordance with order of reception within macroblock. In more practical sense, forward difference motion vector received first within macroblock is added to reconstructed motion vector stored in register memory PMV1. Moreover, forward difference motion vector received secondly within macroblock is added to reconstructed motion vector stored in register memory PMV2.

Further, backward difference motion vector received first within macroblock is added to reconstructed motion vector stored in register memory PMV3. In addition, backward difference motion vector received secondly within macroblock is added to reconstructed motion vector stored in register memory PMV4. In this embodiment, order of reception within macroblock of respective motion vectors provides indices indicating which register of register memories PMV1~PMV4 stores therein reconstructed motion vector to be added to respective difference motion vectors.

In other words, in this embodiment, indices of "1"~"2" are given in order of receptions of forward difference motion vectors within macroblock, and indices of "3"~"4" are given in order of receptions of backward difference motion vectors therewithin. Thus, motion vectors having respective indices and the register memories PMV are caused to have one-to-one correspondence relationship.

In addition, syntax of bit stream of motion vector is as having been already shown in the above-mentioned Table 4. Also in this case, as indicated by the Table, motion vectors to be transmitted and registers PMV are caused to respectively correspond to each other. Explanation of Table 4 is the same as that which has been carried out on the encoder side.

It is to be noted that, in updating register memory PMV1, macroblock in which the number of reception of forward difference motion vectors is 1 updates register memory PMV2 by; the same value. Further, in updating register memory PMV3, macroblock in which the number of reception of backward difference motion vectors is 1 updates register memory PMV4 by the same value.

Switching operation of the register memories PMV will now be described with reference to FIG. 6.

In FIG. 6, in response to the difference motion vector signal S90 inputted through terminal 311, difference motion vector signal flag generator 308 outputs difference motion vector signal flag S306. Such difference motion vector signal flags S306 are counted by difference motion vector counter 309. It is to be noted that when the MB start flag S210 is set, difference motion vector counter 309 is reset. Motion vector count number signal S307 from the motion vector counter 309 is inputted to register index designation signal generator 310. To this generator, the motion compensation mode signal S56, prediction type signal S91, and picture structure signal S201 are inputted.

In this case, the number of transmission of forward difference motion vectors or backward difference motion vectors (motion_vector_count) to be transmitted within macroblock is recognized by the picture structure signal S201 and prediction type signal S91, and the number of transmission of all motion vectors to be transmitted within macroblock is recognized by motion compensation mode signal S56. For example, in the case where "motion_vector_count" is 2 and motion compensation mode signal S56 indicates the bidirectionally predictive mode, since motion vectors to be received within macroblock are received in order of two forward difference motion vectors and two backward difference motion vectors, the number of transmission of all difference motion vectors is 4.

On the basis of this information, register index designation signal generator 310 generates register index designation signal S308 from the motion vector count number signal S307 and outputs it. In accordance with this register index designation signal S308, in the above-described example, for example, when motion vector count number signal S307 takes value 1, register memory PMV1 is designated at register group 305; when that signal takes value 2, register memory PMV2 is designated at register group 305; when that signal takes value 3, register memory PMV3 is designated at register group 305; and when that signal takes value 4, register memory PMV4 is designated at register group 305.

As another example, in the case where there is one "motion_vector_count" and motion compensation mode signal S56 indicates backward predictive mode, since only one backward difference motion vector is transmitted as the number of transmission of all difference motion vectors transmitted within macroblock, when motion vector count number signal S307 takes value 1, register memory PMV3 is designated at register group 305.

The register group 305 responds to the register index designation signal S308 to output motion vector signal S302 stored in the designated register through switch 303.

This output motion vector signal S302 is scale-converted (scale converted output motion vector signal S302), at scale converter 302 of scale conversion C, as occasion demands, by scale indication signal CONVERSION (scale indication signal C) outputted from switching circuit 307 supplied with the prediction type signal S91, and is then inputted to adding circuit 301, at which it is added to the currently inputted difference motion vector signal S90. Thus, motion vector signal S55 is reconstructed. This motion vector signal S55 is outputted from terminal 317 as reconstructed motion vector.

On the other hand, the currently reconstructed motion vector signal S55 is scale-converted by scale indication signal S305 (scale indication signal D) at scale converter 306 of scale conversion D as occasion demands, and is then overwritten into register memory PMV of register group 305 designated by the register index designation signal S308 and is newly stored thereinto.

It is to be noted that the scale converter 302 and the scale converter 306 may be used for spatial scale adjustment at the time of calculating difference motion vector between motion vector making reference to frame and motion vector making reference to field, and/or scale adjustment based on the cause in point of the time base at the time of calculating difference vector between motion vectors having distances different in point of time up to reference field.

Further, reset of register memory PMV of inverse difference determination element 202 of FIG. 6 is carried out at macroblock where motion compensation mode signal S56 indicates intra-coded mode and macroblock where slice start flag S211 is set. At this time, all registers in the register group 305 are reset to zero. Instruction of reset of this register group 305 is carried out by register reset instruction element 318. In this embodiment, this register reset instruction element 318 is supplied with slice start flag S211 through terminal 68 of FIG. 5 and through terminal 319 of FIG. 6, motion compensation mode signal S56, picture coding type signal S202 through terminal 64 of FIG. 5 and terminal 319 of FIG. 6, and skipped macroblock flag S95 through terminal 63 of FIG. 5 and terminal 319 of FIG. 6.

Inverse difference determination element 202 for motion vector is constructed in a manner stated above.

Turning back to FIG. 5, handling of skipped macroblock on the decoder side will now be described.

In FIG. 5, after macroblock is received, address on picture of that macroblock is obtained from header information of macroblock. Namely, macroblock address signal S94 obtained at the inverse VLC element 52 is inputted to macroblock address comparator 203.

In this macroblock address comparator 203, address of macroblock received earlier by one is stored. Comparison between that value and the macroblock address signal S94 is made. As a result, when macroblock addresses are discontinuous, i.e., difference is 2 or more, it is recognized that skipped macroblock exists. The number which is smaller than that difference value by 1 is the number of skipped macroblocks. Then, macroblock address comparator 203 sets skipped macroblock flag S95.

When skipped macroblock flag S95 is set, the decoder of this embodiment enters the processing of skipped macroblock. Initially, the inverse VLC52 outputs zero as the coded block signal S50 when the skipped macroblock flag S95 is set. Accordingly, at this time, the block reproduction difference signal S52 also becomes equal to zero.

Moreover, in the case where, e.g., the picture coding type signal S202 is P picture, first, register reset instruction element 318 resets all registers PMV in the inverse difference determination element 202 for motion vector to zero, secondly, inverse difference determination element 202 outputs zero as motion vector signal S55, thirdly, inverse VLC element 52 outputs motion compensation mode signal S56 as forward prediction, fourthly, inverse VLC element 52 allows prediction type signal S91 to be "Frame based prediction" when picture structure signal S201 is frame structure, allows it to be "16×16 Field based prediction" when picture structure signal S201 is field structure, and allows it to be "16×16 Frame based prediction" when picture structure signal S201 is progressive, fifthly, inverse VLC element 52 allows field motion vector reference parity signal S92 to be equal to predicted field parity signal S94, and sixthly, it outputs zero as sub motion vector signal S93.

Further, in the case where, e.g., picture coding type signal S202 is B picture, first, inverse difference determination element 202 outputs value stored in register memory PMV as motion vector signal S55, and secondly, memory 204 outputs motion compensation mode signal S56, prediction type signal S91, field motion vector reference parity signal S92, sub motion vector signal S93, and predicted field parity signal S94 of macroblock decoded immediately before which are stored.

In addition, the processing of the decoder in the case where skipped macroblock is judged by another embodiment on the encoder side is collectively shown below. Initially, in the case where skipped macroblock flag S95 is set in the picture in which picture coding type signal S202 is P picture and picture structure signal S201 is field structure, first, register reset instruction element 78 resets all registers PMV in the inverse difference determination element 202 for motion vector to zero, secondly, inverse difference determination element .202 outputs zero as motion vector signal S55 to motion compensator 56, thirdly, inverse VLC element 52 instructs motion compensator 56 to carry out forward prediction as motion compensation mode S56, fourthly, inverse VLC element 52 instructs motion compensator 56 to carry out field prediction of 16x16 as prediction type signal S91, and fifthly, inverse VLC element 52 instructs motion compensator 56 to output the same parity as that of predicted field parity signal S94 as field motion vector reference parity signal S92.

In the case where skipped macroblock flag S95 is set in the picture in which picture coding type signal S202 is P picture, and picture structure signal S201 is frame structure, first, register reset instruction element 78 resets all registers PMV in the inverse difference determination element 202 for motion vector to zero, secondly, inverse difference determination element 202 outputs zero as motion vector signal S55 to motion compensator 56, thirdly, inverse VLC element 52 instructs motion compensator 56 to carry out forward prediction as motion compensation mode S56, and fourthly, inverse VLC element 52 instructs motion compensator 56 to carry out frame prediction as prediction type signal S91.

In the case where skipped macroblock flag S95 is set in the picture in which picture coding type signal S202 is B picture, and picture structure signal S201 is field structure, first, inverse difference determination element 202 outputs value stored in register memory PMV as motion vector signal S55 to motion compensator 56, secondly, memory 204 outputs, to motion compensator 56, motion compensation mode signal S56, field motion vector reference parity signal S92, and predicted field parity signal S94 of macroblock decoded immediately before which are stored, and thirdly, inverse VLC element 52 instructs motion compensator 56 to carry out field prediction of 16x16 as prediction type signal S91.

In the case where skipped macroblock flag S95 is set in the picture in which picture coding type signal S202 is B picture, and picture structure signal S201 is frame structure, first, inverse difference determination element 202 outputs, to motion compensator 56, value stored in register memory PMV as motion vector signal S55, secondly, memory 204 outputs, to motion compensator 56, motion compensation mode signal S56 of macroblock decoded immediately before which is stored, and thirdly, inverse VLC element 52 instructs motion compensator 56 to carry out frame prediction as prediction type signal S91.

Processing of skipped macroblock is carried out in this way. This processing is repeated by the number of skipped macroblocks. The decoder carries out decoding similarly to ordinary macroblock on the basis of signal thus obtained.

When macroblock which is not skipped macroblock is obtained, i.e., skipped macroblock flag S95 delivered through terminal 66 is "FALSE", the content of memory 204 is updated by motion compensation mode signal S56, prediction type signal S91, field motion vector reference parity signal S92, sub motion vector signal S93, and predicted field parity signal S94 of that macroblock. In this embodiment, picture structure signal S201 and picture coding type signal S202 are also delivered through terminal 65 to the memory 204.

The moving picture decoding apparatus is constructed in a manner stated above, thus to reproduce picture from bit stream.

Finally, a more practical operation of this embodiment will now be described.

FIG. 7 shows the operation in the case where first example (FIG. 18) of determination of difference between motion vectors on the conventional encoder side previously shown is carried out in this embodiment.

In FIG. 7, for example, motion vector of upper portion of macroblock MB0 is $(5, 1)_{(1)}$, motion vector of lower portion of macroblock MB0 is $(5, 5)_{(2)}$, motion vector of upper portion of macroblock MB1 is vector $(5, 5)_{(3)}$, motion vector of lower portion of macroblock MB1 is $(5, 5)_{(4)}$, motion vector of upper portion of macroblock MB2 is $(5, 5)_{(5)}$, and motion vector of lower portion of macroblock MB2 is $(5, 5)_{(6)}$. In addition, $(0, 0)$ is stored in register memories PMV1 and PMV2 of the above-mentioned FIG. 2 (i.e., FIG. 3) as an initial value.

In the case of the example of FIG. 7, in macroblock MB0, $(5, 1)_{(1)}-PMV1=(5, 1)_{(1)}$ which is difference between motion vector $(5, 1)$ of upper portion and initial value $(0, 0)$ of register memory PMV1 is obtained. This value is outputted as difference motion vector of upper portion of MB0. Motion vector $(5, 1)_{(1)}$ is stored into register memory PMV1. Moreover, $(5, 5)_{(2)}-PMV1=(5, 5)$ which is difference between motion vector $(5, 5)_{(2)}$ of lower portion and initial value $(0, 0)$ of register memory PMV2 is obtained. This value is outputted as difference motion vector of lower portion of MB0. Motion vector $(5, 5)_{(2)}$ of lower portion is stored into register memory PMV2. Moreover, in macroblock MB1, $(5, 5)_{(3)}-PMV1=(0, 4)$ which is difference between motion vector $(5, 5)_{(3)}$ of upper portion and value $(5, 1)$ of the register memory PMV1 is obtained. This value is outputted as difference motion vector of upper portion of MB1. Motion vector $(5, 5)_{(3)}$ of upper portion is stored into register memory PMV1. Further, $(5, 5)_{(4)}-PMV2=(0, 0)$ which is difference between motion vector $(5, 5)_{(4)}$ of lower portion of macroblock MB1 and value $(5, 5)_{(2)}$ of the register memory PMV2 is obtained. This value is outputted as difference motion vector of lower portion of MB1. Motion vector $(5, 5)_{(4)}$ of lower portion is stored into register memory PMV2. Similarly, in macroblock MB2, $(5, 5)_{(5)}-PMV1=(0, 0)$ which is difference between motion vector $(5, 5)_{(5)}$ of upper portion and value $(5, 5)_{(3)}$ of the register memory PMV1 is obtained. This value is outputted as difference motion vector of upper portion of MB2. Motion vector $(5, 5)_{(5)}$ of upper portion is stored into register memory PMV1. In addition, $(5, 5)_{(6)}-PMV2=(0, 0)$ which is difference between motion vector $(5, 5)_{(6)}$ of lower portion of macroblock MB2 and value $(5, 5)_{(4)}$ of the register memory PMV2 is obtained. This value is outputted as difference motion vector of lower portion of MB2. Motion vector $(5, 5)_{(6)}$ of lower portion is stored into register memory PMV2.

As stated above, macroblock MB2 has no predictive error signal to be transmitted, and motion compensation mode, etc. is the same as macroblock immediately before. In this case, macroblock MB2 is skipped macroblock. Namely, in the case where macroblock MB2 is skipped macroblock, motion vector is copied from macroblock MB1 immediately before on the decoder side.

FIG. 8 shows the operation on the decoder side. Namely, in FIG. 8, it is now assumed that $(5, 1)_{(1)}$ of difference motion vector of upper portion of macroblock MB0, $(5, 5)_{(2)}$ of difference motion vector of lower portion of macroblock MB0, $(0, 4)_{(3)}$ of difference motion vector of upper portion of macroblock MB1, and $(0, 0)_{(4)}$ of difference motion vector of lower portion of macroblock MB1 are obtained as difference motion vector in the above-mentioned example of FIG. 7, and that macroblock MB2 is skipped macroblock. Further, $(0, 0)$ is stored as an initial value into the register memories PMV1 and PMV2 of FIG. 6 (i.e., FIG. 3) mentioned above.

In the case of the example of FIG. 8, in macroblock MB0, $(5, 1)_{(1)}+PMV1=(5, 1)$ by addition of difference motion vector $(5, 1)_{(1)}$ of upper portion and initial value $(0, 0)$ of register memory PMV1 is obtained as reconstructed motion vector. This reconstructed motion vector is sent to register memory PMV1. Further, in macroblock MB0, $(5, 5)_{(2)}+PMV2=(5, 5)$ by addition of the difference motion vector $(5, 5)_{(2)}$ of lower portion and initial value $(0, 0)$ of the register memory PMV2 is obtained as reconstructed motion vector. This reconstructed motion vector is sent to register memory PMV2. Similarly, in macroblock MB1, $(0, 4)_{(3)}+PMV1=(5, 5)$ by addition of difference motion vector $(0, 4)_{(3)}$ of upper portion and reconstructed motion vector $(5, 1)$ of the register memory PMV1 is obtained as reconstructed motion vector. This reconstructed motion vector is sent to register memory PMV1. Further, in macroblock MB1, $(0, 0)_{(4)}+PMV2=(5, 5)$ by addition of the difference motion vector $(0, 0)_{(4)}$ of lower portion and reconstructed motion vector $(5, 5)$ of the register memory PMV2 is obtained as reconstructed motion vector. This reconstructed motion vector is sent to register memory PMV2. In addition, in macroblock MB2, since this macroblock is skipped macroblock, $(5, 5)_{(5)}$ is copied at upper portion and $(5, 5)_{(6)}$ is copied at lower portion as reconstructed motion vector.

Namely, in the example of FIG. 8, since macroblock MB2 is skipped macroblock, vector is copied from register memory PMV, and motion compensation mode is also copied from macroblock MB1 immediately before. As stated above, in accordance with this embodiment, it is possible to provide correct reconstructed motion vector also with respect to skipped macroblock.

Moving picture coding and decoding apparatuses thus featured are constructed.

INDUSTRIAL APPLICABILITY

In accordance with this invention, in apparatuses for carrying out motion compensating predictive coding and decoding of moving picture, in the case where, with respect to motion vectors given in units of macroblocks, there exist one or more motion vectors making reference to past frame (field) in the forward prediction, there exist one or more motion vectors making reference to future frame (field) in the backward prediction, and there respectively exist one or more motion vectors making reference to both past and future frames (fields), and in the case where the numbers of motion vectors in respective motion compensation modes vary in units of macroblocks, difference determination element for allowing motion vectors to be difference motion vector can be constructed on the encoder side, and skipped macroblock can be judged.

On the decoder side, inverse difference determination element for reconstructing motion vector from received difference motion vector can be constructed. This inverse difference determination element is characterized in that there is no necessity of providing register memory except for register memory PMV in order to hold motion vector of macroblock processed immediately before. In addition, on the decoder side, it becomes possible to handle skipped macroblock.

In the above-described case, it advantageously becomes possible to handle, by this technique, skipped macroblock which could not been handled in the prior art. With respect to macroblock which is skipped macroblock, the encoder does not transmit any data. Skipped macroblock is important coding technology in view of improving coding efficiency.

For example, in the case where even if a picture to be processed is sequence of moving picture, its content is a scene where still pictures (or pictures having very gentle movement) are successive, most macroblocks can be dealt as skipped macroblock. In extreme case, the first frame may be coded within picture without motion compensation to transmit it to handle that macroblock as almost skipped macroblock from the second frame and frames succeeding thereto. In this case, great improvement of coding efficiency can be expected.

I claim:

1. A picture signal coding method comprising the step of:

coding an input picture signal every macroblock on the basis of a plurality of modes, whereby when picture coding type in the plurality of modes is P picture and picture structure in the plurality of modes is frame structure, the method further comprises the steps of:

judging, every coded macroblock, whether or not the following conditions are satisfied: (i) predictive error signal is zero, (ii) motion vector is zero, (iii) motion compensation mode in the plurality of modes is the forward prediction, and (iv) prediction type in the plurality of modes is frame predictions; and processing the coded macroblock as a skipped block only when said conditions are satisfied.

2. A picture signal decoding method comprising the step of:

detecting a skipped macroblock from a coded picture signal, whereby when picture coding type of the skipped macroblock is P picture, and picture structure is frame structure, the method further comprises the steps of:

resetting all memories in an element for determination of reconstructed motion vector from difference to zero, and carrying out decoding only under the conditions where coded block signal is zero, motion vector is zero, motion compensation mode is forward prediction, and prediction type is frame prediction.

3. A picture signal coding apparatus comprising:

means for coding an input picture signal every macroblock on the basis of a plurality of modes, judging means for judging, when picture coding type in the plurality of modes is P picture and picture structure in the plurality of modes is frame structure, every macroblock, whether or not the following conditions are satisfied: (i) predictive error signal is zero, (ii) motion vector is zero, (iii) motion compensation mode in the plurality of modes is forward prediction, and (iv) prediction type in the plurality of modes is frame prediction, and processing means for processing the coded macroblock as a skipped macroblock only when said conditions are satisfied.

4. A picture signal decoding apparatus comprising:

means for detecting a skipped macroblock from a coded picture signal, and decoding means such that when picture coding type of the skipped macroblock is P picture, and picture structure is frame structure, said decoding means resets all memories in an element for determination of reconstructed motion vector from difference to zero, thus to carry out decoding only under the conditions where coded block signal is zero, motion vector is zero, motion compensation mode is forward prediction, and prediction type is frame prediction.

* * * * *